(12) United States Patent
Hagiopol et al.

(10) Patent No.: US 9,404,221 B2
(45) Date of Patent: Aug. 2, 2016

(54) COMPOSITIONS THAT INCLUDE HYDROPHOBIZING AGENTS AND STABILIZERS AND METHODS FOR MAKING AND USING SAME

(71) Applicant: Georgia-Pacific Chemicals LLC, Altanta, GA (US)

(72) Inventors: Cornel Hagiopol, Lilburn, GA (US);
Adam K. Sniady, Lilburn, GA (US);
David F. Townsend, Grayson, GA (US);
Bobby L. Williamson, Conyers, GA (US)

(73) Assignee: Georgia-Pacific Chemicals LLC, Atlanta, GA (US)

( * ) Notice: Subject to any disclaimer, the term of this patent is extended or adjusted under 35 U.S.C. 154(b) by 4 days.

(21) Appl. No.: 14/135,459

(22) Filed: Dec. 19, 2013

(65) Prior Publication Data

US 2014/0202647 A1    Jul. 24, 2014

Related U.S. Application Data

(60) Provisional application No. 61/756,197, filed on Jan. 24, 2013.

(51) Int. Cl.
| | |
|---|---|
| *D21H 21/16* | (2006.01) |
| *C08L 97/02* | (2006.01) |
| *C08L 61/06* | (2006.01) |
| *C08L 97/00* | (2006.01) |
| *C04B 24/38* | (2006.01) |
| *C08L 91/06* | (2006.01) |

(52) U.S. Cl.
CPC ............. *D21H 21/16* (2013.01); *C04B 24/383* (2013.01); *C08L 61/06* (2013.01); *C08L 91/06* (2013.01); *C08L 97/005* (2013.01); *C08L 97/02* (2013.01)

(58) Field of Classification Search
CPC .......... C08L 91/06; C08L 97/02; C08L 61/06
USPC ........................................................ 152/165
See application file for complete search history.

(56) References Cited

U.S. PATENT DOCUMENTS

| | | | |
|---|---|---|---|
| 4,193,814 A * | 3/1980 | Shen | 106/123.12 |
| 6,113,729 A * | 9/2000 | Chiu | 156/296 |
| 6,291,558 B1 * | 9/2001 | Raskin et al. | 524/13 |
| 6,576,175 B1 * | 6/2003 | Roos | 264/109 |
| 2005/0011621 A1 * | 1/2005 | Westermark et al. | 162/9 |
| 2005/0197441 A1 * | 9/2005 | Shibutani et al. | 524/459 |
| 2006/0030629 A1 * | 2/2006 | Wantling et al. | 516/38 |
| 2006/0243323 A1 * | 11/2006 | Wantling et al. | 137/87.01 |
| 2006/0264519 A1 * | 11/2006 | Eckert et al. | 516/41 |
| 2007/0245931 A1 * | 10/2007 | Wantling | 106/778 |
| 2009/0114123 A1 * | 5/2009 | Clark et al. | 106/164.01 |
| 2009/0272292 A1 * | 11/2009 | Wantling | 106/162.5 |
| 2011/0245381 A1 * | 10/2011 | Winterowd et al. | 524/14 |
| 2012/0263963 A1 * | 10/2012 | Mahoney et al. | 428/484.1 |
| 2014/0202647 A1 * | 7/2014 | Hagiopol et al. | 162/164.6 |

* cited by examiner

*Primary Examiner* — Michael A Salvitti
(74) *Attorney, Agent, or Firm* — Ram W. Sabnis

(57) ABSTRACT

Compositions that include hydrophobizing agents and stabilizers and methods for making and using same are provided. In at least one specific embodiment, a composition can include about 40 wt % to about 60 wt % lignosulfonic acid or a salt thereof, about 1 wt % to about 20 wt % of a hydrophobizing agent, and about 20 wt % to about 59 wt % of a liquid medium, where all weight percents are based on the combined weight of the lignosulfonic acid or salt thereof, the hydrophobizing agent, and the liquid medium.

20 Claims, No Drawings

COMPOSITIONS THAT INCLUDE HYDROPHOBIZING AGENTS AND STABILIZERS AND METHODS FOR MAKING AND USING SAME

CROSS-REFERENCE TO RELATED APPLICATION

This application claims priority to U.S. Provisional Patent Application having Ser. No. 61/756,197, filed Jan. 24, 2013, which is incorporated by reference herein.

BACKGROUND

1. Field

Embodiments described generally relate to compositions of hydrophobizing agents and stabilizers and methods for making and using same.

2. Description of the Related Art

Various types of engineered lignocellulose composites, such as flakeboard, waferboard, particleboard, and oriented strand board are known and used in construction applications. These composite products are prepared by applying adhesives to lignocellulosic particles, chips, or fibers and forming them into the desired composite through application of heat and pressure. Small amounts of hydrophobizing agents, commonly applied as an emulsion, are used to improve the moisture resistance of the lignocellulosic materials. Known emulsions include slack wax, fatty acid soaps, and non-ionic emulsifiers.

These emulsions, however, have drawbacks. For example, these emulsions often include hydrophilic stabilizers that impart water to the lignocellulose materials, which can make production more difficult and interfere with the properties of the composite product. There can also be a lack of compatibility between the emulsions and the adhesives used to bind the lignocellulosic materials, which can cause de-emulsification and/or plugging of manufacturing lines.

There is a need, therefore, for improved compositions containing hydrophobizing agents and stabilizers for use with composite lignocellulose products.

SUMMARY

Compositions that include hydrophobizing agents and stabilizers, methods for making same, and uses for same in making composite products are provided. In at least one specific embodiment, a composition can include about 40 wt % to about 60 wt % lignosulfonic acid or a salt thereof, about 1 wt % to about 20 wt % of a hydrophobizing agent, and about 20 wt % to about 59 wt % of a liquid medium, where all weight percents are based on the combined weight of the lignosulfonic acid or salt thereof, the hydrophobizing agent, and the liquid medium.

In at least one specific embodiment, a method for making a composite product can include mixing a plurality of lignocellulose substrates, a binder, and a mixture comprising a lignosulfonic acid or a salt thereof, a hydrophobizing agent, and a liquid medium to produce a resinated furnish. The mixture can include about 40 wt % to about 60 wt % of the lignosulfonic acid or salt thereof, about 1 wt % to about 20 wt % of the hydrophobizing agent, and about 20 wt % to about 59 wt % of the liquid medium, where all weight percents are based on the combined weight of the lignosulfonic acid or salt thereof, the hydrophobizing agent, and the liquid medium. The method can also include heating the resinated furnish to produce a composite product.

In at least one specific embodiment, a composite product can include an at least partially cured resinated furnish. Prior to curing, the resinated furnish can include a plurality of lignocellulose substrates, a binder, and a mixture that can include lignosulfonic acid or a salt thereof, a hydrophobizing agent, and a liquid medium. The mixture can include about 40 wt % to about 60 wt % of the lignosulfonic acid or salt thereof, about 1 wt % to about 20 wt % of the hydrophobizing agent, and about 20 wt % to about 59 wt % of the liquid medium, where all weight percents are based on the combined weight of the lignosulfonic acid or salt thereof, the hydrophobizing agent, and the liquid medium.

DETAILED DESCRIPTION

It has been surprisingly and unexpectedly discovered that compositions or mixtures that include hydrophobizing or sizing agents, stabilizers, and liquid mediums can be formed that contain a high concentration of the stabilizer. These mixtures can be in the form of an emulsion, suspension, dispersion, and/or solution. It has been surprisingly found that the stabilizer can be present in the composition in an amount of about 30 wt % or more, about 40 wt % or more, or about 50 wt % or more, based on the combined weight of the stabilizer, the hydrophobizing agent, and the liquid medium. The stabilizer can be or include one or more lignosulfonic acids and/or one or more salts thereof. The stabilizer or lignosulfonic acid and/or the salt thereof can be present in the mixture in an amount from a low of about 30 wt %, about 35 wt %, about 37 wt %, about 40%, or about 45 wt %, to a high of about 50%, about 55%, about 60%, about 65%, or about 70%, based on the combined weight of the lignosulfonic acid or salt thereof, the hydrophobizing agent, and the liquid medium. In another example, the lignosulfonic acid and/or salt thereof can be present in the mixture in an amount of about 35 wt % to about 42 wt %, about 39 wt % to about 44 wt %, about 42 wt % to about 48 wt %, about 46 wt % to about 52 wt %, about 45 wt % to about 55 wt %, about 50 wt % to about 57 wt %, or about 55 to about 68 wt %, based on the combined weight of the lignosulfonic acid or salt thereof, the hydrophobizing agent, and the liquid medium. In yet another example, the lignosulfonic acid and/or one or more salts thereof can be present in the mixture in an amount of at least 30 wt %, at least 35 wt %, at least 40% wt, at least 45 wt %, or at least 50 wt % to about 55 wt %, about 57 wt %, about 60 wt %, about 63 wt %, or about 65 wt %, based on the combined weight of the lignosulfonic acid or salt thereof, the hydrophobizing agent, and the liquid medium.

The mixture of the hydrophobizing agent and the stabilizer can be used as a sizing agent for making composite lignocellulose products. The high concentration of stabilizer in the mixture can provide colloidal stability for the preparation of such emulsion, suspension, dispersion, and/or solution while providing the necessary surface activity to ensure effective deposition of the one or more hydrophobizing agents onto the surface of lignocellulose substrates. The high concentration of stabilizer in the mixture can also reduce or lower the concentration of the liquid medium, e.g., water, that can be combined with the hydrophobizing agent and the stabilizer to produce the mixture. Reducing the liquid medium content in the composite lignocellulose product can lower the manufacturing costs. For example, the reduced presence of the liquid medium can correlate to less energy input needed to cure the resins to produce the composite products.

The mixture of the hydrophobizing agent and the lignosulfonic acid or salt thereof can include at least about 0.5 wt % to about 30 wt % of the hydrophobizing agent, based on the combined weight of the lignosulfonic acid or salt thereof, the hydrophobizing agent, and the liquid medium. For example, the emulsion can include the hydrophobizing agent in an amount from a low of 0.5 wt %, about 0.7 wt %, about 1wt %, about 3 wt %, about 6 wt %, about 9 wt %, or about 12 wt % to a high of about 15 wt %, about 20 wt %, about 23 wt %, or about 25 wt %, based on the combined weight of the lignosulfonic acid or salt thereof, the hydrophobizing agent, and the liquid medium. In another example, the hydrophobizing agent can be present in the mixture in an amount from about 0.6 wt % to about 3 wt %, about 1.3 wt % to about 5.5 wt %, about 5 wt % to about 8 wt %, about 1 wt % to about 10 wt %, about 7 wt % to about 12 wt %, about 9 wt % to about 16 wt %, about 14 wt % to about 17 wt %, about 15 wt % to about 18 wt %, about 19 wt % to about 25 wt %, or about 25 wt % to about 30 wt %, based on the combined weight of the lignosulfonic acid or salt thereof, the hydrophobizing agent, and the liquid medium.

In one or more embodiments, the hydrophobizing agent can include a single hydrophobizing agent. In one or more embodiments, the hydrophobizing agent can be or include two or more different hydrophobizing agents. If the hydrophobizing agent includes two different hydrophobizing agents, i.e., a first hydrophobizing agent and a second hydrophobizing agent, the first and second hydrophobizing agents can be present in any amount with respect to one another. For example, the first and second hydrophobizing agents can be present in a weight ratio of about 99:1, about 90:10, about 80:20, about 70:30, about 60:40, about 50:50, about 40:60, about 30:70, about 20:80, about 10:90, or about 1:99. In another example, if the hydrophobizing agent includes a first hydrophobizing agent and a second hydrophobizing agent, the mixture can have a hydrophobizing agent composition that includes the first hydrophobizing agent in an amount from about 1 wt % to about 99 wt % and conversely about 99 wt % to about 1 wt % of the second hydrophobizing agent, based on the combined weight of the first and second hydrophobizing agents. In another example, the amount of the first hydrophobizing agent can be from a low of about 5 wt %, about 10 wt %, about 15 wt %, about 20 wt %, about 25 wt % about 30 wt %, about 35 wt %, about 40 wt %, or about 45 wt % to a high of about 60 wt %, about 65 wt %, about 70 wt %, about 75 wt %, about 80 wt %, about 85 wt %, about 90 wt %, or about 95 wt %, based on the combined weight of the first and second hydrophobizing agents. In another example, if three or more hydrophobizing agents are present, then the three or more hydrophobizing agents can be present in any ratio with respect to one another.

If two or more hydrophobizing agents are present in the mixture, the two or more hydrophobizing agents can be combined with one another as a solid, a liquid, or as a combination of solid and liquid. If solid, the hydrophobizing agent can be heated to its melting point and introduced into the mixing tank or heated within the mixing tank to provide the hydrophobizing agent in liquid form. The mixture of hydrophobizing agents can be agitated to achieve a homogeneous product. Mixing blades, impellers, magnetic stir bars, shear agitation, or other mechanical means can be used to mix the hydrophobizing agents. In another example, in-line mixing through a mixing tube can, for example, also be used to achieve the final product. In another example, ultrasonic sound waves can be used to mix, blend, or otherwise combine the hydrophobizing agents.

The mixture of the hydrophobizing agent and lignosulfonic acid or salt thereof can have a liquid medium content from a low of about 18 wt %, about 20 wt %, or about 25 wt % to a high of about 35 wt %, about 40 wt %, or about 59 wt %, based on the combined weight of the lignosulfonic acid or salt, the hydrophobizing agent, and the liquid medium. For example, the mixture of the hydrophobizing agent and the lignosulfonic acid or salt thereof can have a liquid medium content or water concentration of about 59 wt % or less, about 45 wt % or less, about 40 wt % or less, about 35 wt % or less, about 30 wt % or less, or about 25 wt % or less, based on the combined weight of the lignosulfonic acid or salt, the hydrophobizing agent, and the liquid medium. In other example, the mixture of the hydrophobizing agent and the lignosulfonic acid or salt thereof can have a liquid medium content of about 15 wt % to about 25 wt %, about 20 wt % to about 30 wt %, about 20 wt % to about 59 wt %, about 25 wt % to about 35 wt %, about 27 wt % to about 40 wt %, about 33 wt % to about 43 wt %, about 37 wt % to about 49 wt %, about 45 wt % to about 56 wt %, or about 45 wt % to about 59 wt %, based on the combined weight of the lignosulfonic acid or salt, the hydrophobizing agent, and the liquid medium.

The viscosity of the mixture of the hydrophobizing agent and the lignosulfonic acid or salt thereof can vary widely. For example, the viscosity of the mixture of the hydrophobizing agent and the lignosulfonic acid or salt thereof can be from a low of about 1 centipoise ("cP"), about 100 cP, about 250 cP, about 500 cP, or about 700 cP to a high of about 1,000 cP, about 3,250 cP, about 4,500 cP, about 5,000 cP, or about 10,000 cP at a temperature of about 25° C. In another example, the mixture of the hydrophobizing agent and the lignosulfonic acid or salt thereof can have a viscosity from about 10 cP to about 125 cP, about 20 cP to about 75 cP, about 75 cP to about 125 cP, about 260 cP to about 460 cP, about 725 cP to about 1,100 cP, about 4,100 cP to about 8,600 cP, about 8,600 cP to about 9,200 cP, or about 7,900 cP to about 9,990 cP at a temperature of about 25° C. In another example, the mixture of the hydrophobizing agent and the lignosulfonic acid or salt thereof can have a viscosity from about 1 cP to about 450 cP, about 450 cP to about 1,205, about 6,250 cP to about 7,550 cP, about 6,550 cP to about 8,250 cP, about 7,250 cP to about 9,100 cP, about 8,100 cP to about 9,600 cP, or about 6,600 cP to about 8,200 cP at a temperature of about 25° C. The viscosity can be measured using a Brookfield viscometer. For example, the Brookfield Viscometer can be equipped with a small sample adapter such a 10 mL adapter and the appropriate spindle to maximize torque such as a spindle no. 31.

The mixture can also include one or more inorganic bases. Illustrative inorganic bases can be or include, but are not limited to, potassium hydroxide, sodium hydroxide, calcium hydroxide, magnesium hydroxide, or any mixture or combination thereof. The inorganic base can be present in the mixture in an amount from about a low of about 0.1 wt %, about 0.3 wt %, about 0.5 wt %, about 0.8 wt %, or about 1 wt % to a high of about 4 wt %, about 5 wt %, or about 6 wt %, based on the combined weight of the lignosulfonic acid or salt, the hydrophobizing agent, the inorganic base, and the liquid medium. In another example, the inorganic base can be from about 0.2 wt % to about 0.4 wt %, about 0.5 wt % to about 0.7 wt %, about 1.0 wt % to about 1.6 wt %, about 2.4 wt % to about 4.0 wt %, or about 3.2 wt % to about 5.8 wt %, based on the combined weight of the lignosulfonic acid or salt, the hydrophobizing agent, the inorganic base, and the liquid medium.

The pH of the mixture can be from a low of about 1, about 2, about 3, about 4, about 5, about 6, about 7 to a high of about 8, about 9, about 10, about 11, about 12, or about 13. In another example, the pH of the mixture of the hydrophobizing agent and the lignosulfonic acid or salt thereof can have a pH from about 1 to about 2, about 2 to about 3, about 3 to about 4, about 4 to about 5, about 5 to about 6, about 6 to about 7, about 7 to about 8, about 8 to about 9, about 9 to about 10, about 10 to about 11, about 11 to about 12, or about 12 to about 13.

The mixture can include one or more additives. Illustrative additives can include, but are not limited to, surfactants, dispersants, corrosion inhibitors, dyes, fungicides, insecticides, or any mixture thereof. Illustrative surfactant can include, but are not limited to, dioctyldimethylammonium chloride, didecyldimethylammonium chloride, dicocodimethylammonium chloride, cocobenzyldimethylammonium chloride, coco (fractionated)benzyldimethylammonium chloride, octadecyl trimethylammonium chloride, dioctadecyl dimethylammonium chloride, dihexadecyl dimethylammonium chloride, di(hydrogenated tallow)dimethylammonium chloride, di(hydrogenated tallow)benzylmethylammonium chloride, (hydrogenated tallow)benzyldimethylammonium chloride, dioleyldimethylammonium chloride, and di(ethylene hexadecanecarboxylate)dimethylammonium chloride, alkylphenol, ethoxilated, ethoxilated fatty acids, ethoxylated fatty alcohols, salts of fatty acids, ethylene oxide-propylene oxide block copolymers, or any mixture thereof.

The dispersant, if present, can include non-surface active polymers or surface-active substances added to improve the separation of particles and/or to inhibit settling or clumping. The dispersant can be cationic, anionic, non-ionic, or amphoteric. The dispersant can include natural starches and derivatized starches. Suitable starch dispersants can include, but are not limited to, hydroxyethyl-, hydroxypropyl-, methylhydroxypropyl- and ethythydroxyethylcellulose, methyl- and carboxymethylcellulose, gelatin, starch, guar gum, xanthan gum, polyvinyl alcohol, and mixtures thereof. The starch dispersant can include nano-starches. Such nano-starches can include those sold by Ecosynthetix, Inc. Derivatized starches can be obtained by reacting natural starches with cationizing agents, such as glycidyltrimethylammonium chloride or 3-chloro-2-hydroxypropyltrimethylammonium chloride. Non-ionic dispersants can include, but are not limited to, ethoxylated fatty alcohols, fatty acids, alkyl phenols, fatty acid amides, ethoxylated or non-ethoxylated glycerol esters, sorbitan esters of fatty acids, and mixtures thereof. Suitable cationic dispersants can include nitrogen-containing compounds such as quaternary ammonium compounds, salts of tertiary amines, water-soluble nitrogen-containing epichlorohydrin resins, cationic polyurethanes, polyamidoamines, poly-amideamine-epichlorohydrin copolymers, dimethylamine-epichlorohydrin copolymers, dimethylamine-ethylenediamine-epichlorohydrin copolymers, ammonia-ethylenendichloride copolymers, homopolymers and copolymers of diallyldimethylammonium chloride, dialkyl-aminoalkyl acrylates, methacrylates and acrylamides (e.g., dimethylaminoethyl acrylates and methacrylates), cationic polymers (e.g., polyacrylamide, polyethyleneimine, polyamidoamine and poly(diallyldimethyl ammonium chloride)) and mixtures thereof. Suitable anionic dispersants can include, but are not limited to, phosphated, sulphonated and carboxylated lignin or polysaccharides, anionic polyurethanes, naphthalene sultanates, and vinyl addition polymers formed from monomers with anionic groups (e.g., acrylic acid, methacylic acid, maleic acid, itaconic acid, crotonic acid, vinylsulfonic acid, sulfonated styrene and phosphates of hydroxyalkyl acrylates, and methacrylates). The weight ratio of the hydrophobizing agent to the dispersant to can be from a low of about 0.1 wt %, about 1 wt %, about 0.1 wt %, about 5 wt %, or about 7 wt %, to a high of about 15 wt %, about 18 wt %, or about 20 wt %. In another example, the dispersant can be present in the mixture in an amount from about a low of about 0.1 wt %, about 5 wt %, about 7 wt %, or about 10 wt % to a high of about 18 wt %, about 22 wt %, or about 30 wt %, based on the combined weight of the lignosulfonic acid or salt, the hydrophobizing agent, the dispersant, and the water. In another example, the dispersant can be from about 0.2 wt % to about 0.4 wt %, about 1 wt % to about 7 wt %, about 10 wt % to about 16 wt %, or about 20 wt % to about 25 wt %, based on the combined weight of the lignosulfonic acid or salt, the hydrophobizing agent, the inorganic base, and the water.

The mixture of the hydrophobizing agent and the lignosulfonic acid or salt thereof can have a non-volatile material or "solids" content from a low of about 20 wt %, about 40 wt %, about 50 wt %, or about 65 wt % to a high of about 75 wt %, about 80 wt %, about 85 wt %, about 95 wt %, or about 99.9 wt %, based on the combined weight of the lignosulfonic acid or salt thereof, the hydrophobizing agent, and the liquid medium. In other example, the emulsion can have a solids content of about 20 wt % to about 59 wt %, about 40 wt % to about 60 wt %, about 60 wt % to about 80 wt %, about 80 wt % to about 95 wt %, about 25 wt % to about 75 wt %, about 60 wt % to about 90 wt %, or about 75 wt % to about 85 wt %, based on the combined weight of the lignosulfonic acid or salt, the hydrophobizing agent, and the liquid medium. In another example, the emulsion can have a solids content of at least 20 wt %, at least 33 wt %, at least 41 wt %, at least 50 wt %, at least 55 wt %, or at least 62 wt %, based on the combined weight of the lignosulfonic acid or salt, the hydrophobizing agent, and the liquid medium.

As used herein, solids content, as understood by those skilled in the art, can be measured by determining the weight loss upon heating a small sample, e.g., 1-5 grams of the mixture, to a suitable temperature, e.g., 125° C., and a time sufficient to remove the liquid therefrom. By measuring the weight of the sample before and after heating, the percent solids in the sample can be directly calculated or otherwise estimated.

The mixture of the hydrophobizing agent and the lignosulfonic acid or salt thereof can be prepared using any suitable method or combination of methods. For example, the mixture of the hydrophobizing agent and the lignosulfonic acid or salt thereof can be emulsified, suspended, dispersed, and/or formed into a solution with a shear homogenizer, a sonicator, and/or high pressure valve homogenizer (also known as a dynamic high pressure homogenizer). A shear homogenizer uses shear forces to emulsify the mixture and to reduce the particle size of the emulsion. A sonicator uses sound or ultrasound energy to emulsify the mixture and reduce the particle size of the emulsion. A high pressure valve homogenizer mixes the components and reduces the particle size by building up pressure on one side of a valve and then allowing the mixture to flow through a narrow, adjustable gap of the valve causing turbulent streams, and resulting in the mixing of components and a reduction of particle size. The mixture of the hydrophobizing agent and the lignosulfonic acid or salt thereof can be mixed in a high pressure valve homogenizer at a pressure from a low of about 1.3 MPa, about 5 MPa, about 10 MPa, or about 50 MPa, to a high of about 100 MPa, about 150 MPa or about 207 MPa. In another example, the mixture of the hydrophobizing agent and the lignosulfonic acid or salt thereof can be mixed in a high pressure valve homogenizer at a pressure from about 2 MPa to about 10 MPa, about 11 MPa to about 19 MPa, about 22 MPa to about 35 MPa, about 10 MPa to about 45 MPa, about 12 MPa to about 150 MPa, or about 13 MPa to about 202 MPa.

The hydrophobizing agent and the lignosulfonic acid or salt thereof in the mixture can have a particle size from a low of about 25 nm, about 50 nm, about 75 nm or about 90 nm to a high of about 200 nm, about 300 mm, about 2,000 nm, about 3,000 nm, about 4,000 nm or about 5,000 nm. In another example, the mixture of the hydrophobizing agent and the lignosulfonic acid or salt thereof can have particle size from about 30 nm to about 55 nm, about 66 nm to about 110 nm, about 50 nm to about 300 nm, about 100 nm to about 169 nm, about 149 nm to about 210 nm, about 200 nm to about 400 nm, about 1,005 nm to about 1,755 nm, or about 2,200 nm to about 4,855 nm. The mixture of the hydrophobizing agent and the lignosulfonic acid or salt thereof can have an average particle size from a low of about 80 nm, about 90 nm, about 100 nm, about 120 nm, about 140 nm, about 160 nm, about 180 nm, about 200 nm to a high of about 220 nm, about 250 nm, about 300 nm, about 400 nm, about 500 nm, about 1,000 nm, about 2,000 nm, about 3,000 nm, about 4,000 nm, or about 5,000 mm. In another example, the mixture of the hydrophobizing agent and the lignosulfonic acid or salt thereof can have an average particle size from about 80 mm to about 175 nm, about 110 nm to about 170 nm, about 150 nm to about 230 nm, about 280 nm to about 380 nm, about 150 nm to about 190 nm, about 150 nm to about 2,000 nm, about 160 nm to about 1,000 nm, about 800 nm to about 1,200 nm, about 2,000 nm to about 3,000 nm, or about 3,500 nm to about 4,500 nm.

The mixture of the hydrophobizing agent and the lignosulfonic acid or salt thereof can be emulsified, suspended, and/or dispersed at temperature from a low of about 10° C., about 20° C., about 30° C., about 40° C., about 50° C. to a high of about 80° C., about 100° C., about 120° C., about 140° C., or about 160° C. In another example, the mixture of the hydrophobizing agent and the lignosulfonic acid or salt thereof can be emulsified and/or dispersed at temperature from about 15° C. to about 35° C., about 25° C. to about 55° C., about 65° C. to about 85° C., about 80° C. to about 95° C., about 105° C. to about 115° C., about 100° C. to about 125° C., or about 135° C. to about 155° C.

The liquid medium can include, but is not limited to, water, one or more alcohols, one or more ethers, or any mixture thereof. Suitable alcohols can include, but are not limited to, methanol, ethanol, propanol, isopropanol, n-butanol, sec-butanol, isobutanol, tert-butanol, ethylene glycol, and mixtures thereof. Suitable ethers can include, but are not limited to, dimethyl ether, diethyl ether, tetrahydrofuran, and mixtures thereof.

In one or more embodiments, the liquid medium can include a single liquid medium. In one or more embodiments, the liquid medium can be or include two or more different liquid media. If the liquid medium includes two different liquid media, i.e., a first liquid medium and a second liquid medium, the first and second liquid media can be present in any amount with respect to one another. For example, the first and second liquid media can be present in a weight ratio of about 99:1, about 90:10, about 80:20, about 70:30, about 60:40, about 50:50, about 40:60, about 30:70, about 20:80, about 10:90, or about 1:99. In another example, if the liquid medium includes a first liquid medium and a second liquid medium, the mixture can have a liquid medium that includes the first liquid medium in an amount from about 1 wt % to about 99 wt % and conversely about 99 wt % to about 1 wt % of the second liquid medium, based on the combined weight of the first and second liquid media. In another example, the amount of the first liquid medium can be from a low of about 5 wt %, about 10 wt %, about 15 wt %, about 20 wt %, about 25 wt % about 30 wt %, about 35 wt %, about 40 wt %, or about 45 wt % to a high of about 60 wt %, about 65 wt %, about 70 wt %, about 75 wt %, about 80 wt %, about 85 wt %, about 90 wt %, or about 95 wt %, based on the combined weight of the first and second liquid media. In another example, if three or more liquid media are present, then the three or more liquid media can be present in any ratio with respect to one another.

The lignosulfonic acid and the one or more salts thereof can be derived from lignin. Lignin is a polymeric substance that can include substituted aromatics found in plant and vegetable matter associated with cellulose and other plant constituents. Illustrative plant and vegetable matter can include, but is not limited to, straw, hemp, sisal, cotton stalk, wheat, bamboo, sabai grass, rice straw, banana leaves, paper mulberry (i.e., bast fiber), abaca leaves, pineapple leaves, esparto grass leaves, fibers from the genus *Hesperaloe* in the family Agavaceae jute, salt water reeds, palm fronds, flax, ground nut shells, hardwoods, softwoods, recycled fiberboards such as high density fiberboard, medium density fiberboard, low density fiberboard, oriented strand board, particleboard, or any combination thereof. For example, the plant matter can be or include wood, for example hardwoods, softwoods, or a combination thereof. Illustrative types of wood can include, but are not limited to, alder, ash, aspen, basswood, beech, birch, cedar, cherry, cottonwood, cypress, elm, fir, gum, hackberry, hickory, maple, oak, pecan, pine, poplar, redwood, sassafras, spruce, sycamore, walnut, and willow.

Suitable lignin material can include, but is not limited to, lignin in its native or natural state, i.e., non-modified or unaltered lignin, lignosulfonates, or any combination or mixture thereof. Suitable lignosulfonates can include, but are not limited to, ammonium lignosulfonate, sodium lignosulfonate, potassium lignosulfonate, calcium lignosulfonate, magnesium lignosulfonate, or any combination or mixture thereof. The lignosulfonic acid can be used as is and a salt or other similar component may be used to modify the acid, or, more preferably, the lignosulfonic acid may be used in its salt form. Similar components performing in a manner equivalent to the lignosulfonic acid or its salt can be used as substitutes therefore provided that the desired edge swell, water absorption, internal bonding and/or flexural strength properties of the composites lignocellulose products are met.

The one or more hydrophobizing agents can be or include one or more waxes, such as petroleum waxes, montan waxes, synthetic waxes, and natural waxes, such as vegetable waxes or animal waxes. The hydrophobizing agent can be or include alkyl ketene dimers, alkenyl succinic anhydrides, mineral oils, rosins, synthetic esters, silicone oils, turpenes, hydrocarbon resins, fluorocarbon polymers, vegetable oils, atactic polyethylene polymers, ethylene-acrylic acid polymers, animal fats or oils, triglycerides, and any mixture thereof.

Illustrative petroleum waxes can include, but are not limited to, paraffin wax, microcrystalline wax, and slack wax. Petroleum waxes can be either in the form of varying levels of refined paraffins, or less refined slack wax, as part of the petroleum refining process. Paraffin wax can be or include mixtures of alkanes that can have about 20 to about 40 carbon chains. The carbon chains of the paraffin wax can be linear or branched. Microcrystalline waxes can be wax produced by de-oiling petrolatum, as part of the petroleum refining process microcrystalline wax contains a higher percentage of branched alkanes and cycloalkanes. The microcrystalline wax can consist of high molecular weight saturated aliphatic hydrocarbons and can be characterized by the fineness of its crystal structures in contrast to the larger crystal structures associated with paraffin waxes. Slack wax can be produced by chilling and solvent filter-pressing wax distillate from the petroleum refining process. Slack wax can be semi-refined wax, distinguished from scale wax, which can have higher oil content.

The petroleum wax can have a petroleum oil content of up to about 30 wt %, based on the weight of the petroleum wax. The petroleum wax can have an oil content from a low of about 1 wt %, about 3 wt %, about 5 wt %, about 7 wt %, or about 10 wt %, to a high of about 15 wt %, about 20 wt %, about 25 wt %, or about 30 wt %, based on the weight of the petroleum wax. In another example, the petroleum wax can have an oil content from about 2 wt % to about 6 wt %, about 7 wt % to about 12 wt %, about 15 wt % to about 22 wt %, or about 24 wt % to about 29 wt %, based on the weight of the petroleum wax.

Various melting points can be acceptable if the drying conditions of the composite lignocellulose products are altered, as such any techniques known in the composite board manufacturing arts can be used to account for the melting point of the petroleum wax. The paraffin wax can be a solid at room temperature, which can begin to enter the liquid phase when heated to a temperature of about 37° C. to about 110° C. The microcrystalline wax can have a melting range from about 60° C. to about 80° C. The slack wax can have a melting range from about 40° C. to about 75° C.

The montan wax, also known as lignite wax, can be esters from montanic acids. They can be produced from lignite that has been extracted, bleached, and esterfied or saponified. Montan waxes can consist of long chain (C24-C30) carboxylic acid esters in about 62 wt % to about 68 wt %, long chain (C24-C30) carboxylic acids in about 22 wt % to about 26 wt %, long chain alcohols, ketones, and alkanes in about 7 wt % to about 15 wt %, and the remaining resins. The montan wax can have a melting point from about 82° C. to about 95° C. Montan wax can have limited solubility in water but solvents such as carbon tetrachloride, benzene, chloroform or other organic solvents can be used to incorporate it into the emulsion.

The synthetic wax can include, but is not limited to, ethylenic polymers, fluorocarbon polymers, or hydrocarbons types derived via Fischer-Tropsch synthesis. The synthetic wax can be derived from alkyl acids and/or alkyl esters. For example, high molecular weight fatty acids of with chain lengths greater than 18 carbons can be used. Such alkyl acids are generally described as being of formula R—COOH, where R is an alkyl non-polar group which is lipophilic and can be from 18 to more than 100 carbons. For example octacosanoic acid and its corresponding ester which is, for example, a di-ester of that acid with ethylene glycol. The COOH group can form hydrophilic polar salts in the presence of alkali metals such as sodium or potassium in the emulsion. Such alkyl acids can adsorb onto the surface of the wax particles providing stability in the emulsion in the aqueous phase. Other esterified products of alkyl acids with alcohols or glycols can be used. The fluorocarbon polymer can be a tetrafluoroethylene wax.

The synthetic wax can also include polyethylene wax, polypropylene wax, ethylene-acrylic acid polymers. The polyethylene waxes can be manufactured from ethylene. The polyethylene wax can be oxidized or co-polymerized with acrylic acid to yield the polyethylene groups, which can aid emulsification. The polyethylene either high density polyethylene or low density polyethylene. High density polyethylene can have a melting range from 110° C. to 140° C. The low density polyethylene can have a melting range 100° C. to 110° C. The ethylene-acrylic acid polymers can have 20 wt % acrylic acid content and can be crosslinked with suitable crosslinkers to increase their water resistance properties.

The fluorocarbon polymers can include tetrafluoroethylene wax. The tetrafluoroethylene wax can possess high heat resistance, e.g., up to about 330° C. The fluorine groups of the tetrafluoroethylene wax give effective release, slip and, rub properties.

The hydrophobizing agent can be or include mineral oils or liquid paraffins. Illustrative of the mineral oils, but not limited to, is paraffin oil. The mineral oil (also known as liquid petrolatum) can be a by-product in the distillation of petroleum. It can be a transparent colorless oil composed of linear, branched, and cyclic alkanes (paraffins) of various molecular weights. The mineral oil can be refined through distillation, hydrogenation, hydrotreating, and/or other refining processes. Other names for mineral oil include, but are not necessarily limited to, paraffin oil, paraffinic oil, lubricating oil, white mineral oil, and white oil.

Suitable rosins can be any modified or unmodified rosins suitable for sizing paper, including unfortified rosin, fortified rosin and extended rosin, as well as rosin esters, and mixtures and blends thereof. The rosin can be any of the commercially available types of rosin, such as wood rosin, gum rosin, tall oil rosin, and mixtures of any two or more, in their crude or refined state. Partially hydrogenated rosins and polymerized rosins, as well as rosins that have been treated to inhibit crystallization, such as by heat treatment or reaction with formaldehyde, also can be employed.

The hydrophobizing agent can be or include synthetic esters such as fatty acid esters and phthalates. Illustrative fatty acid esters can include, but are not limited to, tall oil fatty acids that have undergone esterification. Illustrative phthalates can include, but are not limited to, dibutyl phthalate and diallyl phthalate.

Suitable alkyl ketene dimers ("AKD") can be characterized by the general formula:

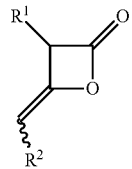

Formula I where the substituents $R^1$ and $R^2$ are independently a $C_8$- to $C_{30}$-hydrocarbon radical which may be saturated or unsaturated, linear or branched. The substituents $R^1$ and $R^2$ comprise, for example, the following radicals: octyl, decyl, dodecyl, tetradecyl, hexadecyl, octadecyl, eicosyl, docosyl, tetracosyl, phenyl, benzyl, β-naphthyl and cyclohexyl.

The compounds of the Formula I can be prepared by reacting carboxylic acid chlorides with tertiary amines. Carboxylic acid chlorides can be obtained by chlorination of naturally occurring fatty acids or mixtures thereof. For example, carboxylic acid chlorides based on fatty acids can be obtained from coconut oil, tall oil, castor oil, olive oil, beef tallow, palm kernel oil, and the like. Suitable carboxylic acid chlorides can include, but are not limited to, myristoyl chloride, palmitoyl chloride, stearoyl chloride, oleoyl chloride, behenoyl chloride and isostearoyl chloride.

Suitable alkyl succinic anhydride ("ASA") can include structures with a five-membered, anhydride ring and linear carbon chains. Alkyl succinic anhydride can be represented by the general formula:

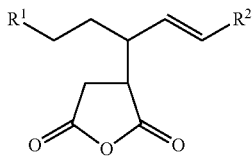

Formula II where the substituents $R^1$ and $R^2$ are independently $C_1$ to $C_{20}$ hydrocarbon radicals, which can be saturated or unsaturated, linear or branched. The reactive ring can be at various positions relative to the chain, and most commercial ASA consists of a mixture of these isomers. For example, $R^1$ can be octyl and $R^2$ can be decyl.

A wide variety of alkyl succinic anhydrides can be used as the hydrophobizing agent. Mixtures of alkyl succinic anhydrides can be used. The ASA can be a light amber oil. The ASA can be prone to hydrolysis so care must be taken to keep it dry. Hydrolysis can be minimized by preparing the emulsion as late as possible often right before the addition to the lignocellulose materials.

Suitable silicone oil can include branched or linear siloxane polymer chains. The siloxane polymer chains can be terminated with alkoxy functional groups.

Suitable hydrocarbon resins can include, but are not limited to, low molecular weight polybutadiene and low molecular weight copolymers of butadiene and piperylene, isoprene, styrene and styrene derivatives. The hydrocarbon resins can be also modified with maleic anhydride.

The hydrophobizing agent can be or include one or more turpenes, such as carene, thujene, and sabinene. The hydrophobizing agent can also include turpentine.

The hydrophobizing agent can be or include one or more vegetable oils. Illustrative vegetable oils can include, but are not limited to, safflower oil, grapeseed oil, sunflower oil, walnut oil, soybean oil, cottonseed oil, coconut oil, corn oil, olive oil, palm oil, peanut oil, rapeseed oil, canola oil, sesame oil, hazelnut oil, almond oil, beech nut oil, cashew oil, macadamia oil, mongongo nut oil, pecan oil, pine nut oil, pistachio oil, grapefruit seed oil, lemon oil, orange oil, watermelon seed oil, bitter gourd oil, buffalo gourd oil, butternut squash seed oil, egusi seed oil, pumpkin seed oil, watermelon seed oil, borage seed oil, blackcurrant seed oil, evening primrose oil, açaí oil, black seed oil, borage seed oil, flaxseed oil, carob pod oil, amaranth oil, apricot oil, apple seed oil, argan oil, avocado oil, babassu oil, ben oil, borneo tallow nut oil, cape chestnut, algaroba oil, cocoa butter, cocklebur oil, poppyseed oil, cohune oil, coriander seed oil, date seed oil, dika oil, false flax oil, hemp oil, kapok seed oil, kenaf seed oil, lallemantia oil, mafura oil, manila oil, meadowfoam seed oilmustard oil, okra seed oil, papaya seed oil, perilla seed oil, persimmon seed oil, pequi oil, pili nut oil, pomegranate seed oil, prune kernel oil, quinoa oil, ramtil oil, rice bran oil, royle oil, shea nut oil, sacha inchi oil, sapote oil, seje oil, taramira oil, tea seed oil, thistle oil, tigernut oil, tobacco seed oil, tomato seed oil, wheat germ oil, castor oil, colza oil, flax oil, mustard oil, radish oil, salicornia oil, tung oil, honge oil, jatropha oil, jojoba oil, nahor oil, paradise oil, petroleum nut oil, dammar oil, linseed oil, stillingia oil, vernonia oil, amur cork tree fruit oil, artichoke oil, balanos oil, bladderpod oil, brucea javanica oil, burdock oil, candlenut oil, carrot seed oil, chaulmoogra oil, crambe oil, croton oil, cuphea oil, honesty oil, jojoba oil, mango oil, neem oil, oojon oil, rose hip seed oil, rubber seed oil, sea buckthorn oil, sea rocket seed oil, snowball seed oil, tall oil, tamanu oil, tonka bean oil, ucuhuba seed oil, or mixtures thereof. Illustrative animal oils or animal fats can include, but are not limited to, lard, mutton, tallow, horse oil, beef tallow, butter, pig oil, chicken oil, or any mixture thereof.

The hydrophobizing agent can be or include vegetable waxes, such as carnauba wax. Carnauba wax is a protective coating for leaves that can be harvested from Copernica Cerifera, a Brazilian palm tree. Carnauba is a hard, brittle wax with a melting point of 86° C. One illustrative animal wax can include beeswax.

The triglycerides can have a saponification value of at least 150, at least 160, at least 170, at least 180, or at least 190. For example, the triglycerides can have a saponification value from a low of about 150, about 155, about 160, about 165, about 170, about 175, about 180, about 185, or about 190 to a high of about 195, about 200, about 205, about 210, about 220, about 230, about 240, about 250, about 260, or about 270. The triglycerides can have an Iodine value of at least 35, at least 40, at least 45, or at least 50. For example, the triglycerides can have an Iodine value from a low of about 35, about 37, about 40, about 43, about 45, about 47, or about 50 to a high of about 55, about 57, about 60, about 65, about 70, or about 75. Illustrative examples of materials that can include triglycerides and have suitable saponification and Iodine values can include, but are not limited to, rapeseed oil, menhaden oil, corn oil, olive oil, cacao oil, soy oil, linseed oil, cottonseed oil, lard, mutton tallow, peanut oil, horse oil, beef tallow, palm oil, butter, palm kernel oil, coconut oil, or any mixture thereof.

The saponification value is the milligrams of potassium hydroxide (KOH) required to saponify a 1 gram sample and corresponds to the sum of an acid value and an ester value. When the saponification value is measured, a sample can be saponified with approximately 0.5N potassium hydroxide in an alcohol solution, and excess potassium hydroxide can be titrated with 0.5N hydrochloric acid.

To measure the Iodine value, the amount of halogen absorbed by a sample of the triglyceride can be measured while the halogen acts on the sample. The amount of halogen absorbed can be converted to iodine and expressed in grams per 100 grams of the sample. The iodine value is grams of iodine absorbed by 100 grams of fat, and the degree of unsaturation of fatty acid in the sample increases with the iodine value. A chloroform or carbon tetrachloride solution can be prepared as a sample, and an alcohol solution of iodine and mercuric chloride or a glacial acetic acid solution of iodine chloride can be added to the sample. After the sample is allowed to stand, the iodine that remains without causing any reaction is titrated with a sodium thiosulfate standard solution, thus calculating the amount of iodine absorbed.

The mixture of the hydrophobizing agent and the lignosulfonic acid or salt thereof can have a flash point above a press temperature used to produce composite products that include the mixture to reduce fire hazards. For example, the hydrophobizing agent can have a flash point from a low of about 150° C., about 160° C., or about 170° C., to a high of about 220° C., about 230° C., about 250° C., or about 300° C. In another example, the hydrophobizing agent can have flash point of about 155° C. to about 165° C., about 175° C. to about 185° C., about 190° C. to about 205° C., about 210° C. to about 220° C., about 225° C. to about 250° C., or about 260° C. to about 295° C.

The hydrophobizing agent can have a melting point from a low of about 20° C., about 30° C., about 50° C. or about 60° C. to a high of about 90° C., about 120° C., about 130° C., or about 170° C. In another example, the hydrophobizing agent can have a melting point from about 25° C. to about 45° C., about 45° C. to about 60° C., about 65° C. to about 80° C., about 85° C. to about 100° C., about 105° C. to about 120° C., about 125° C. to about 145° C., or about 150° C. to about 170° C.

The mixture of the hydrophobizing agent and the lignosulfonic acid or salt thereof can be mixed with one or more binders or resins. The mixture of the hydrophobizing agent and the lignosulfonic acid or salt thereof can be used with oxidative binders or binders that include one or more free radical precursors. As used herein, the term free radical precursor refers to any compound or mixture of compounds that can generate radicals when subjected to predetermined conditions. For example, the free radical precursor can be a compound or mixture of compounds that can generate radicals when heated to a predetermined temperature. In another example, the free radical precursor can be a compound or mixture of compounds that can generate radicals with hydrogen peroxide (oxidant).

The lignosulfonic acid and the one or more salts thereof used as the stabilizer for the hydrophobic agents are reactive through an oxidation mechanism. As such, the lignosulfonic acid and/or the salt thereof can be involved in the curing of the resin. The cured lignosulfonic acid and the one or more salts thereof can increase the hydrophobicity of the mixture of hydrophobizing agent. The lignosulfonic acid or salt thereof can be used in binder systems in the same or similar manner as discussed and described in U.S. patent applications having Ser. Nos. 61/708,395; 61/782,265; 61/782,302; and 14/040,791.

One or more composite lignocellulose products can be made or produced by coating a plurality of lignocellulose substrates with one or more binders and/or one or more free radical precursors and the mixture of the hydrophobizing agent and the lignosulfonic acid or salt thereof to produce a resinated furnish. The resinated furnish can be in the form of a woven or nonwoven mat. The one or more binders and/or one or more free radical precursors in the resinated furnish can be at least partially cured to form or produce a composite lignocellulose product. Such composite products can include, but are not limited to, oriented strand board, particle board, plywood, waferboard chipboard, medium-density fiberboard, parallel strand lumber, oriented strand lumber, and laminated strand lumber. Lignocellulose composites produced with mixture of the hydrophobizing agent and the lignosulfonic acid or salt thereof herein can be used to produce a variety of articles. For example, the composites can be used as sheathing to form a floor, roof or wall or in furniture, to name a few. In an embodiment, wax emulsion can be used to make a lignocellulose composite.

Thus, the lignocellulose composite can in some aspects be an oriented strand board. An exemplary OSB of the present invention comprises a plurality of lignocellulose substrates, strands, flakes, chips, particles, or wafers wherein each layer of lignocellulose substrates, strands, flakes, chips, particles, or wafers includes strands oriented perpendicularly to the adjacent layers. As used herein, "flakes", "strands", "chips", "particles", and "wafers" are considered equivalent to one another and are used interchangeably. Such lignocellulose strands are bonded together by a binder and sized by a sizing agent disclosed herein. An exemplary OSB of the present invention includes a panel, e.g., a panel having a width of about 1.2 m, a length of about 2.4 m, and a thickness from about 0.5 cm to about 3 cm.

The binders and/or free radical precursors, the mixture of the hydrophobizing agent and lignosulfonic acid or salt thereof, and one or more additives that can be applied to the lignocellulose substrates are referred to herein as a coating, even though the binders and/or free radical precursors, the mixture of a hydrophobizing agent and lignosulfonic acid or salt, and additives may be in the form of small particles, such as atomized particles or solid particles, which may not form a continuous coating upon the lignocellulose material. The binders and/or free radical precursors, mixture of the hydrophobizing agent, and any other additives can be applied to the lignocellulose substrates by one or more spraying, blending, and/or mixing techniques. A preferred technique is to spray a mixture of the hydrophobizing agent, binders and/or free radical precursors, and other additives on the lignocellulose substrates as the substrates are tumbled in a drum blender. In one example, the sizing agent can be added through a j-nozzle at a temperature that is typically between about 60° C. to about 99° C. depending on the melt point of the sizing agent (i.e., the sizing agent is added at temperature above its melting point). The binders and/or free radical precursors and mixture of the hydrophobizing agent and the lignosulfonic acid or salt thereof can be applied sequentially to the lignocellulose substrates strands. The loading level of the mixture of the hydrophobizing agent and the lignosulfonic acid or salt thereof can be from a low of about 0.5 wt %, about 1 wt %, about 3 wt %, about 4 wt %, to a high of about 5 wt %, about 10 wt %, to about 15 wt %, based on the dry weight of the composite product. In another example, the loading level of the mixture of the hydrophobizing agent and the lignosulfonic acid or salt thereof can be from about 0.7 wt % to about 1 wt %, about 0.6 wt % to about 1.5 wt %, about 2 wt % to about 5 wt %, or about 6 wt % to about 10 wt %, based on the dry weight of the composite product. The loading level or amount of the hydrophobizing agent can be from a low of about 0.5 wt %, about 1 wt %, about 3 wt %, about 4 wt %, to a high of about 5 wt %, about 10 wt %, to about 15 wt %, based on the dry weight of the lignocellulose substrates. Ire another example, the loading level or amount of the hydrophobizing agent can be from about 0.7 wt % to about 1 wt %, about 0.6 wt % to about 1.5 wt %, about 2 wt % to about 5 wt %, or about 6 wt % to about 10 wt %, based on the dry weight of the lignocellulose substrates.

In one or more embodiments, the amount of the hydrophobizing agent composed of wax, such as the petroleum waxes, montan waxes, synthetic waxes, and natural waxes discussed and described above, can be less than 5 wt %, less than 4.5 wt %, less than 4 wt %, less than 3.5 wt %, less than 3 wt %, less than 2.5 wt %, less than 2 wt %, less than 1.5 wt %, less than 1 wt %, less than 0.95 wt %, less than 0.9 wt %, less than 0.85 wt %, less than 0.8 wt %, less than 0.75 wt %, less than 0.7 wt %, less than 0.65 wt %, less than 0.6 wt %, less than 0.55 wt %, less than 0.5 wt %, less than 0.45 wt %, less than 0.4 wt %, less than 0.35 wt %, less than 0.3 wt %, less than 0.25 wt %, less than 0.2 wt %, less than 0.15 wt %, less than 0.1 wt %, less than 0.05 wt %, or less than 0.01 wt % wax, based on the dry weight of the wood furnish.

In one or more embodiments, the amount of the hydrophobizing agent can be from about 0.5 wt % to about 10 wt % with the amount of wax as the hydrophobizing agent being less than 50%, less than 45%, less than 40%, less than 35%, less than 30%, less than 25%, less than 20%, less than 15%, less than 10%, less than 9.5%, less than 9%, less than 8.5%, less than 8%, less than 7.5%, less than 7%, less than 6.5%, less than 6%, less than 5.5%, less than 5%, less than 4.5%, less than 4%, less than 3.5%, less than 3%, less than 2.5%, less than 2%, less than 1.5 wt %, less than 1%, less than 0.5%, or less than 0.1% wax, based on the total weight of the hydrophobizing agent. The alkyl ketene dimers, alkenyl succinic anhydrides, mineral oils, rosins, synthetic esters, silicone oils, turpenes, hydrocarbon resins, fluorocarbon polymers, vegetable oils, atactic polyethylene polymers, ethylene-acrylic acid polymers, triglycerides such as animal fats, and any mixture thereof can be used in combination with and make up at least a portion of the hydrophobizing agent or can be used in lieu of any wax.

The plurality of lignocellulose substrates, the one or more free radical precursors and/or the one or more binders, the mixture of the hydrophobizing agent, lignosulfonic acid or salt thereof, and the liquid medium, and any other additive or component can be mixed, blended, stirred, contacted, or otherwise combined with one another to produce the resinated furnish. The resinated furnish can also be referred to as a "furnish," "blended furnish," "resinated mixture," or "resinated furnish." One or more compounds comprising at least two hydrogen atoms that are abstractable in the presence of hydroxyl radicals can optionally be combined with the lignocellulose substrates and the free radical precursor and, if present, the catalyst to produce the mixture. The resinated furnish can be heated to produce the lignocellulose containing composite product or "composite product." For example, the resinated furnish can be heated to a temperature from a low of 60° C., about 90° C., about 120° C., about 150° C., or about 160° C. to a high of about 170° C., about 200° C., about 230° C., about 260° C., or about 300° C. to produce the composite product. In another example, the resinated furnish can be heated to a temperature of at least 60° C., at least 70° C., at least 80° C., at least 90° C., at least 100° C., at least 110° C., at least 120° C., at least 130° C., or at least 140° C. to about 150° C., about 155° C., about 160° C., about 165° C., about 170° C., about 180° C., about 200° C., about 225° C., about 250° C., about 275° C., or about 300° C. In another example, the resinated furnish can be heated to a temperature of about 140° C. to about 200° C., about 155° C. to about 175° C., about 160° C. to about 210° C., about 160° C. to about 175° C., or about 145° C. to about 225° C.

In one or more embodiments, the resinated furnish can be heated in air. In one or more embodiments, the resinated furnish can be heated in an inert atmosphere or substantially an inert atmosphere such as nitrogen. If the resinated furnish is heated in a substantially inert atmosphere the amount of oxygen can be less than about 5 mol %, less than about 3 mol %, less than about 1 mol %, less than about 0.5 mol %, or less than about 0.1 mol % oxygen. Suitable inert gases can include, but are not limited to, nitrogen, argon, or a mixture thereof.

Heating the resinated furnish can cause or promote the at least partial curing of the resinated furnish to produce the composite product. As used herein, the terms "curing," "cured," "at least partially curing," "at least partially cured," and similar terms are intended to refer to the structural and/or morphological change that occurs in the resinated furnish, such as by covalent chemical reaction (crosslinking), ionic interaction or clustering, phase transformation or inversion, and/or hydrogen bonding when the is subjected to conditions sufficient, e.g., sufficiently heated, to cause the properties of a flexible, porous substrate, such as a nonwoven mat or blanket of lignocellulose substrates and/or a rigid or semi-rigid substrate, such as a wood or other lignocellulose containing board or sheet, to which an effective amount of the free radical precursor and, optionally, the polyphenolic compound has been applied, to be altered.

If a free radical precursor is present in the resinated furnish, then at least a portion of the free radical precursor can remain unreacted or otherwise in the same form as when combined with the additional components of the resinated furnish. For example, if the free radical precursor includes one or more oxidants, e.g., hydrogen peroxide ($H_2O_2$), at least a portion of the oxidant in the form of hydrogen peroxide ($H_2O_2$) can be present when heating of the resinated furnish is initiated or started. In one or more embodiments, the resinated furnish can contain at least 11%, at least 13%, at least 15%, at least 20%, at least 25%, at least 30%, at least 35%, at least 40%, at least 45%, at least 50%, at least 55%, at least 60%, at least 65%, or at least 70% of the total amount of free radical precursor initially present in the resinated furnish, i.e., the total amount of the free radical precursor combined with the plurality of lignocellulose substrates and, optionally, the one or more compounds comprising at least two hydrogen atoms that are abstractable in the presence of hydroxyl radicals, when the mixture is heated. In another example, the resinated furnish can contain from about 11% to about 95%, about 15% to about 85%, about 20% to about 90%, about 30% to about 80%, about 11% to about 100%, about 35% to about 75%, about 40% to about 70%, about 50% to about 70%, about 60% to about 80%, about 65% to about 85%, or about 30% to about 95% of the total amount of free radical precursor initially present in the resinated furnish when the resinated furnish is heated. In at least one specific example, if the resinated furnish can include about 5 wt % free radical precursor, based on the dry weight of the lignocellulose substrates when the resinated furnish is initially formed and when the resinated furnish is heated to a temperature of 60° C. or more at least 11% of the free radical precursor can be present in the mixture. Said another way, if the resinated furnish contains about 5 wt % of the one or more free radical precursors, based on the dry weight of the lignocellulose substrates, upon preparation or formation of the resinated furnish, when heating the resinated furnish is initiated or started, the mixture can have a free radical precursor concentration of at least 11% of the initial 5 wt % or 0.55 wt %, based on the dry weight of the lignocellulose substrates.

In one or more embodiments, the amount of the one or more free radical precursors present when the resinated furnish is heated, e.g., to a temperature of about 60° C. to about 300° C., can be at least 0.5 wt %, at least 0.7 wt %, at least 1 wt %, at least 1.2 wt %, at least 1.5 wt %, at least 1.7 wt %, at least 2 wt %, at least 2.2 wt %, at least 2.5 wt %, at least 2.7 wt %, at least 3 wt %, at least 3.2 wt %, at least 3.5 wt %, at least 3.7 wt %, at least 4 wt %, at least 4.2 wt %, at least 4.5 wt %, at least 4.7 wt %, or at least 5 wt %, based on the dry weight of the plurality of lignocellulose substrates. For example, the amount of the one or more free radical precursors present when the resinated furnish is heated can be from a low of about 1 wt %, about 1.5 wt %, about 1.6 wt %, about 1.8 wt %, or about 2.1 wt % to high of about 5 wt %, about 7 wt %, about 10 wt %, about 15 wt %, about 20 wt % or more, based on the dry weight of the plurality of lignocellulose substrates. In another example, the amount of the one or more free radical precursors present when the resinated furnish is heated can be from about 1 wt % to about 10 wt %, about 1.5 wt % to about 7 wt %, about 2 wt % to about 6 wt %, about 2.5 wt % to about 8 wt %, about 3 wt % to about 5.5 wt %, about 4 wt % to about 6.5 wt %, about 2.2 wt % to about 11 wt %, or about 2.3 wt % to about 6.3 wt %, based on the dry weight of the plurality of lignocellulose substrates.

The resinated furnish can be heated as soon as the resinated furnish is formed. The resinated furnish can be kept, held, or otherwise maintained at a temperature less than about 60° C. for a period of time prior to heating the resinated furnish to a temperature of at least 60° C. At least one way an exothermic reaction between the components of the resinated furnish can be substantially and significantly slowed and/or prevented such that the resinated furnish does not significantly increase in temperature until the resinated furnish is intentionally heated can be to select an appropriate free radial precursor or mixture of free radical precursors. In other words, the temperature of the resinated furnish, without external heat directed to the resinated furnish, can remain free from or substantially free from the development of an exotherm by selectively selecting an appropriate free radical precursor(s). The particular temperature of the resinated furnish during the time period before heating can depend, at least in part, on the ambient or environmental temperature where the resinated furnish is located. In one or more embodiments, the resinated furnish can be maintained at a temperature of less than 60° C. without any intentional removal of heat therefrom. In one or more embodiments, the resinated furnish can be maintained at a temperature of less than 60° C. with removal of heat therefrom, e.g., the resinated furnish can be located within a refrigeration device and/or a cooled fluid such as chilled air can be directed toward and/or passed through the mixture. In one or more embodiments, the resinated furnish can be maintained at a temperature of less than 60° C. by controlling or adjusting a water concentration of the mixture. For example, increasing the water concentration of the resinated furnish can reduce, inhibit, or prevent the resinated furnish from undergoing an exothermic reaction.

Prior to heating the resinated furnish to a temperature of at least 60° C., the resinated furnish can be maintained at a temperature less than 60° C., less than 55° C., less than 50° C., less than 45° C., less than 40° C., less than 35° C., or less than 30° C. for at least 10 minutes, at least 13 minutes, at least 15 minutes, at least 17 minutes, at least 20 minutes, at least 23 minutes, at least 25 minutes, at least 27 minutes, at least 30 minutes, at least 33 minutes, at least 35 minutes, at least 37 minutes, at least 40 minutes, at least 43 minutes, at least 45 minutes, at least 47 minutes, at least 50 minutes, at least 53 minutes, at least 55 minutes, at least 57 minutes, or at least 60 minutes. For example, the resinated furnish can be maintained at a temperature less than 60° C. for at least 10 minutes to about 30 minutes, at least about 15 minutes to about 35 minutes, at least about 20 minutes to about 40 minutes, at least about 18 minutes to about 45 minutes, or at least about 15 minutes to about 40 minutes prior to heating the resinated furnish to a temperature of at least 60° C. In another example, the resinated furnish can be maintained at a temperature less than 60° C. for at least 10 minutes, about 30 minutes, about 45 minutes, about 1 hour, about 2 hours, about 3 hours, about 5 hours, about 12 hours, about 18 hours, about 24 hours, or about 30 hours prior to heating the resinated furnish to a temperature of at least 60° C.

Prior to heating the resinated furnish to a temperature of at least 60° C., the amount of energy generated from the resinated furnish due to exothermic reaction(s) between the components of the resinated furnish can be less than about 20 cal/g of the resinated furnish, less than about 18 cal/g of the resinated furnish, less than about 16 cal/g of the resinated furnish, less than about 15 cal/g of the resinated furnish, less than about 14 cal/g of the resinated furnish, or less than about 13.8 cal/g of the resinated furnish. For example, prior to heating the resinated furnish to a temperature of at least 60° C., the amount of energy generated from the resinated furnish due to exothermic reaction(s) between the components of the resinated furnish can be less than 14 cal/g, less than 13.5 cal/g, less than 13 cal/g, less than 12.5 cal/g, less than 12 cal/g, less than 11.5 cal/g, less than 11 cal/g, less than 10.5 cal/g, less than 10 cal/g, less than 9.5 cal/g, less than 9 cal/g, less than 8.5 cal/g, less than 8 cal/g, less than 7.5 cal/g, less than 7 cal/g, less than 6.5 cal/g, less than 6 cal/g, less than 5.5 cal/g, less than 5 cal/g, less than 4.5 cal/g, less than 4 cal/g, less than 3.5 cal/g, less than 3 cal/g, less than 2.5 cal/g. less than 2 cal/g, less than 1.5 cal/g, less than 1 cal/g, or less than 0.5 cal/g of the resinated furnish.

Composite products in the shape or form of a panel, sheet, board, or the like can be in the form of a rectangular prism that includes six outer surfaces, i.e., three pairs of oppositely facing surfaces. The first pair of oppositely facing surfaces of the composite product can include a first or "top" surface and an opposing second or "bottom" surface. The second and third pairs of oppositely facing surfaces of the composite product can be referred to as the "side surfaces" that have a surface area less than the surface area of the first and second surfaces. As such, composite products in the shape or form of a panel, sheet, board, or the like can have an average thickness, where the average thickness is the length or distance between the first and second surfaces.

If the composite product is in the form of a panel, sheet, board, or the like, the amount or length of time the mixture can be heated can range from a low of about 5 seconds per millimeter (s/mm), about 10 s/mm, about 12 s/mm, or about 15 s/mm to a high of about 17 s/mm, about 19 s/mm, about 21 s/mm, about 23 s/mm, about 25 s/mm, about 27 s/mm, about 30 s/mm, about 35 s/mm, about 40 s/mm, about 50 s/mm, or about 60 s/mm, where the length refers to the average thickness of the composite product, and with suitable ranges including the combination of any two values. For example, the mixture can be heated for a time of about 7 s/mm to about 27 s/mm, about 9 s/mm to about 24 s/mm, about 11 s/mm to about 22 s/mm, about 8 s/mm to about 20 s/mm, about 14 s/mm to about 18 s/mm, about 6 s/mm to about 14 s/mm, about 10 s/mm to about 18 s/mm, or about 10 s/mm to about 16 s/mm, where the length refers to the average thickness of the composite product. In another example, the mixture can be heated for a time less than 22 s/mm, less than 20 s/mm, less than 18 s/mm, less than 17 s/mm, less than 16 s/mm, less than 15 s/mm, less than 14 s/mm, less than 13 s/mm, or less than 12 s/mm, where the length refers to the average thickness of the composite product. In one specific example, a composite product in the form of a panel, sheet, board, or the like and having an average thickness of about 15 mm and subjected to a total heating time of about 4 minutes would correspond to heating the mixture for about 16 s/mm. In at least one specific example, the mixture can be heated to a temperature of about 160° C. to about 170° C. for a time of 13 s/mm to about 19 s/mm.

Pressure can optionally be applied to the resinated furnish before, during, and/or after the resinated furnish is heated to produce the composite product. For example, if the desired composite product shape or structure is a panel, sheet, board, or the like, an amount of the mixture sufficient to produce a composite product of the desired size, can be transported, directed, placed, introduced, disposed, or otherwise located within a press capable of pressing the mixture before the mixture is heated and/or when the mixture is heated. The press can be an open press or a closed press. In at least one specific embodiment, an open press can be used to press the resinated furnish when the resinated furnish is heated, e.g., to a temperature of about 100° C. to about 250° C. In another example, the resinated furnish can be extruded through a die (extrusion process) and heated to produce the composite product. The resinated furnish can be pressed under a pressure from a low of about 0.5 MPa, about 1 MPa, about 3 MPa, or about 5 MPa to a high of about 7 MPa, about 9 MPa, or about 11 MPa.

Illustrative open presses can be as discussed and described in U.S. Pat. Nos. 4,017,248; 5,337,655; 5,611,269; 5,950,532; 6,098,532; and 6,782,810. Suitable, commercially available, open presses can include, but are not limited to, the CONTIROLL® press available from Siempelkamp and the CPS press available from Dieffenbacher.

The pH of the resinated furnish can be acidic, neutral, or basic. For example, the pH of the resinated furnish can be from a low of about 1, about 2, or about 3 to a high of about 4, about 5, about 6, about 7, or about 8, with suitable ranges including the combination of any two values. In another example, the pH of the resinated furnish can be from about 1 to about 6, about 1.5 to about 5.5, about 2.5 to about 4.5, about 2 to about 3.5, or about 2.5 to about 3.5. The pH of the resinated furnish can be adjusted to any desired pH by combining one or more base compounds, one or more acid compounds, or a combination of one or more base compounds and one or more acid compounds therewith.

Illustrative base compounds that can be used to adjust the pH of the resinated furnish can include, but are not limited to, hydroxides, carbonates, ammonia, amines, or any combination thereof. Illustrative hydroxides can include, but are not limited to, sodium hydroxide, potassium hydroxide, ammonium hydroxide (e.g., aqueous ammonia), lithium hydroxide, and cesium hydroxide. Illustrative carbonates can include, but are not limited to, sodium carbonate, sodium bicarbonate, potassium carbonate, and ammonium carbonate. Illustrative amines can include, but are not limited to, trimethylamine, triethylamine, triethanolamine, diisopropylethylamine (Hunig's base), pyridine, 4-dimethylaminopyridine (DMAP), and 1,4-diazabicyclo[2.2.2]octane (DABCO).

Illustrative acid compounds that can be used to adjust the pH of the resinated furnish can include, but are not limited to, one or more mineral acids, one or more organic acids, one or more acid salts, or any combination thereof. Illustrative mineral acids can include, but are not limited to, hydrochloric acid, nitric acid, phosphoric acid, sulfuric acid, or any combination thereof. Illustrative organic acids can include, but are not limited to, acetic acid, formic acid, citric acid, oxalic acid, uric acid, lactic acid, or any combination thereof. Illustrative acid salts can include, but are not limited to, ammonium sulfate, sodium bisulfate, sodium metabisulfite, or any combination thereof.

The resinated furnish can include one or more liquid mediums. The one or more liquid mediums can be present in any one or more of the lignocellulose substrates, the free radical precursor, and/or the optional compound comprising at least two hydrogen atoms that are abstractable in the presence of hydroxyl radicals. The liquid medium can be or include, but is not limited to, water, alcohols, glycols, acetonitrile, dimethyl sulfoxide, N,N-dimethylformamide, N-methylpyrrolidone, or any combination thereof. Suitable alcohols can include, but are not limited to, methanol, ethanol, propanol, isopropanol, butanol, or any combination thereof. Suitable glycols can include, but are not limited to, ethylene glycol, propylene glycol, or a combination thereof. As used herein, the terms "aqueous medium" and "aqueous liquid" can be or include water and/or mixtures composed of water and/or other water-miscible solvents. Illustrative water-miscible solvents can include, but are not limited to, alcohols, ethers, amines, other polar aprotic solvents, and the like. In at least one example, the liquid medium can be water and the catalyst, the oxidant, and/or the polyphenolic compound can be combined with water.

The resinated furnish can have a liquid, e.g., water, content from a low of about 1 wt %, about 3 wt %, about 5 wt %, or about 10 wt % to high of about 12 wt %, about 14 wt %, about 16 wt %, about 18 wt %, about 20 wt %, about 22 wt %, or about 24 wt %, based on the total weight of the resinated furnish, with suitable ranges including the combination of any two values. For example, when the resinated furnish contains water as the liquid, the resinated furnish can have a moisture content of about 10 wt % to about 25 wt %, about 12 wt % to about 20 wt %, about 11 wt % to about 19 wt %, about 13 wt % to about 18 wt %, about 15 wt % to about 18 wt %, about 12 wt % to about 17 wt %, or about 14 wt % to about 17 wt %, based on the total weight of the resinated furnish.

The components of the resinated furnish can be combined simultaneously or in any order or sequence with respect to one another. For example, the free radical precursor, the mixture of the hydrophobizing agent and the lignosulfonic acid or salt thereof, and, if present, the one or more compounds having at least two hydrogen atoms that are abstractable in the presence of hydroxyl radicals can be combined with the lignocellulose substrates simultaneously. In another example, the free radical precursor and the mixture of the hydrophobizing agent and the lignosulfonic acid or salt thereof, and the lignosulfonic acid or salt thereof can be combined with the lignocellulose substrates to produce a first mixture and then the optional compound having at least two hydrogen atoms that are abstractable in the presence of hydroxyl radicals can be combined with the first mixture to produce the mixture. In another example, the mixture of the hydrophobizing agent and the lignosulfonic acid or salt thereof, the compound having at least two hydrogen atoms that are abstractable in the presence of hydroxyl radicals can be combined with the lignocellulose substrates to produce a first or partial mixture, and then the free radical precursor can be combined with the first or partial mixture to produce the mixture. In another example, the mixture of a hydrophobizing agent and lignosulfonic acid or salt thereof, the compound having at least two hydrogen atoms that are abstractable in the presence of hydroxyl radicals, and the free radical precursor can be mixed with the lignocellulose substrates to produce a first or partial mixture, and then the oxidant can be combined or with the first or partial mixture to produce the mixture. In another example, the mixture of the hydrophobizing agent and the lignosulfonic acid or salt thereof and the free radical precursor can be mixed with the lignocellulose substrates to produce a first or partial mixture, and then the compound having at least two hydrogen atoms that are abstractable in the presence of hydroxyl radicals and the oxidant can mixed or with the first or partial mixture to produce the mixture. In another example, the mixture of a hydrophobizing agent and ligno-sulfonic acid or salt thereof, the compound having at least two hydrogen atoms that are abstractable in the presence of hydroxyl radicals, and the transition metal salt, transition metal complexes and combination thereof can be mixed with the lignocellulose substrates to produce a first or partial mixture, and then the hydrogen peroxide can be sprayed on or contacted on with the first or partial mixture to produce the mixture.

If the free radical precursor includes two or more components, e.g., a catalyst and an oxidant, the components of the free radical precursor can be combined with the lignocellulose substrates, the mixture of a hydrophobizing agent and lignosulfonic acid or salt thereof, and the optional compound having at least two hydrogen atoms that are abstractable in the presence of hydroxyl radicals in any order or sequence. For example, if the free radical precursor includes a catalyst and an oxidant, the catalyst and the mixture of a hydrophobizing agent and lignosulfonic acid or salt thereof can be combined with the lignocellulose substrates to produce a first partial mixture and the oxidant can be combined with the first partial mixture to produce the mixture or vice versa. In another example, the catalyst, the mixture of a hydrophobizing agent and lignosulfonic acid or salt thereof, and the compound having at least two hydrogen atoms that are abstractable in the presence of hydroxyl radicals can be combined with one another to produce a first partial mixture, the first partial mixture can be combined with the lignocellulose substrates to produce a second partial mixture, and the oxidant can be combined with the second partial mixture to produce the mixture. In still another example, the oxidant, the mixture of a hydrophobizing agent and lignosulfonic acid or salt thereof, and the compound having at least two hydrogen atoms that are abstractable in the presence of hydroxyl radicals can be combined with one another to produce a first partial mixture, the first partial mixture can be combined with the lignocellulose substrates to produce a second partial mixture, and the catalyst can be combined with the second partial mixture to produce the mixture. In another example, the oxidant, the mixture of a hydrophobizing agent and lignosulfonic acid or salt thereof, and the catalyst can be combined with one another to produce a first partial mixture, the first partial mixture can be combined with the lignocellulose substrates to produce a second partial mixture, and the compound having at least two hydrogen atoms that are abstractable in the presence of hydroxyl radicals can be combined with the second partial mixture to produce the mixture.

The components of the resinated furnish can be introduced or otherwise contacted with one another via any suitable delivery method. For example, the lignocellulose substrates can be in a vessel or other container and the free radical precursor, the mixture of a hydrophobizing agent and lignosulfonic acid or salt thereof, and, if present, the compound having at least two hydrogen atoms that are extractable in the presence of hydroxyl radicals can be sprayed or otherwise directed onto the lignocellulose substrates to produce the mixture. In another example, the free radical precursor, the mixture of a hydrophobizing agent and lignosulfonic acid or salt thereof, and, if present, the compound having at least two hydrogen atoms that are extractable in the presence of hydroxyl radicals can be poured or brushed onto the lignocellulose substrates. In another example, the lignocellulose substrates and the mixture of a hydrophobizing agent and lignosulfonic acid or salt thereof can be directed, transported, introduced, or otherwise conveyed into a vessel already containing any one or more of the other components of the resinated furnish. Said another way, the lignocellulose substrates and the mixture of a hydrophobizing agent and lignosulfonic acid or salt thereof can be dipped, soaked, or otherwise contacted with the free radical precursor and, optionally, the compound having at least two hydrogen atoms that are extractable in the presence of hydroxyl radicals.

The amount of free radical precursor present in the resinated furnish can depend, at least in part, on the particular composition of the free radical precursor, lignocellulose substrates, and/or, if present, the compound having at least two hydrogen atoms that are abstractable in the presence of hydroxyl radicals and, thus, can widely vary. For example, the amount of radical precursor in the resinated furnish can be from about 1 wt % to about 200 wt %, based on the dry weight of the lignocellulose substrates. In another example, the amount of radical precursor in the resinated furnish can be from a low of about 1 wt %, about 5 wt %, about 10 wt %, or about 20 wt % to a high of about 80 wt %, about 100 wt %, about 120 wt %, or about 150 wt %, based on the dry weight of the lignocellulose substrates, with suitable ranges including the combination of any two values. In another example, the radical precursor can be present in the resinated furnish in an amount from about 0.1 wt % to about 30 wt %, about 1 wt % to about 20 wt %, about 5 wt % to about 50 wt %, about 10 wt % to about 70 wt %, about 0.5 wt % to about 25 wt %, about 3 wt % to about 6 wt %, or about 2 wt % to about 8 wt %, based on the dry weight of the lignocellulose substrates. In still another example, the radical precursor can be present in the resinated furnish in amount of about 0.1 wt % to about 10 wt %, about 1 wt % to about 12 wt %, about 2 wt % to about 9 wt %, about 3 wt % to about 9 wt %, about 5 wt % to about 15 wt %, about 4 wt % to about 6 wt %, about 8 wt % to about 20 wt %, or about 2 wt % to about 10 wt %, based on the dry weight of the lignocellulose substrates.

Illustrative free radical precursors can include, but are not limited to, one or more azo compounds, one or more oxidants, a combination or mixture of one or more catalysts and one or more oxidants, or any mixture or combination thereof. Illustrative azo compounds can be represented by the general formula R—N═N—R', where R and R' can independently be substituted aryl or substituted alkyl. The term "aryl" refers to an aromatic substituent containing a single aromatic ring or multiple aromatic rings that are fused together, linked covalently, or linked to a common group such as a methylene or ethylene moiety. More specific aryl groups contain one aromatic ring or two or three fused or linked aromatic rings, e.g., phenyl, naphthyl, biphenyl, anthracenyl, phenanthrenyl, and the like. In one or more embodiments, aryl substituents can have from 1 to about 20 carbon atoms. The alkyl can include branched or unbranched alkyls having from 1 to about 15 carbon atoms or more preferably from 1 to about 8 carbon atoms. Illustrative alkyls can include, but are not limited to, methyl, ethyl, n-propyl, isopropyl, isobutyl, n-butyl, sec butyl, t-butyl, n-pentyl, n-hexyl, and ethylhexyl. Suitable azo compounds can include, but are not limited to, azobisisobutyronitrile (AIBN).

The catalyst, if present in the free radical precursor, can also be referred to as an initiator, a promoter, a reducer, and/or an accelerator. Suitable catalysts can be or include, but are not limited to, metal ions, tertiary amines, polymeric tertiary amines, polyamines, phosphates, bisulfites, metabisulfites, tetraacetylethylenediamine, cyanamides, ultraviolet light, or any combination thereof. Any catalyst or combination of catalysts can be combined with the lignocellulose substrates and the oxidant to produce the mixture. In addition to or in lieu of contacting the lignocellulose substrates with an oxidant and/or catalyst, ultrasonic waves, photo-Fenton and/or electro-Fenton reactions (in situ generation of hydroxyl radicals by radiation or electric currents) can be used.

Suitable metal can include one or more Group 3 to Group 12 metal atoms. As used herein, all reference to the Periodic Table of the Elements and groups thereof is to the NEW NOTATION published in HAWLEY'S CONDENSED CHEMICAL DICTIONARY, Thirteenth Edition, John Wiley & Sons, Inc., (1997) (reproduced there with permission from IUPAC) unless otherwise noted. Illustrative transition metals can include, but are not limited to, metal ions of iron, copper, manganese, tungsten, molybdenum, cobalt, titanium, or any combination or mixture thereof. The metal can be in the form of an oxide. The metal can be in the form of a salt or complex, e.g., bound to one or more complexing agents or compounds. Illustrative complexing agents or complexing compounds can include, but are not limited to, cyanide ($CN^-$), sulfate ($SO_4^{2-}$), ethylenediaminetetraacetic acid (EDTA), ethylenediamine-N,N'-disuccinic acid (EDDS), ethyleneglycol bis(2-aminoethylether)-N,N,N',N'-tetraacetic acid (EGTA), diethylenetriaminepentaacetic acid (DTPA), trans-1,2-diaminocyclohexane tetraacetic acid (CDTA), iminodisuccinate (IDS), nitrilotracetic acid (NTA), or any combination or mixture thereof. Other complexing compounds can include phosphates, or complexing agents based on phosphonic acid, oxalic acid, ascorbic acid, nitrilo acetate, gallic acid, fulvic acid, or polyoxomethalates.

In one or more embodiments, the catalyst can include $Fe^{2+}$ or $Fe^{3+}$ ions such as iron(II) sulfate, iron(II) oxide, iron(III) sulfate, iron(III) oxide. Other iron ion containing catalysts can include, but are not limited to, $[Fe(CN)_6]^{3-}$, ferrocyanide $[Fe(CN)_6]^{4-}$, and/or $[Fe(CN)_5N0]^{2-}$. For example, the catalyst can be or include, but is not limited to, potassium ferricyanide ($K_3[Fe(CN)_6]$), potassium ferrocyanide ($K_4[Fe(CN)_6]$), ammonium hexacyanoferrate(II) hydrate (($NH_4)_4[Fe(CN)_6].xH_2O$), ammonium iron(III) hexacyanoferrate(II) hydrate, sodium ferrocyanide decahydrate ($Na_4[Fe(CN)_6].10H_2O$), sodium nitroprusside dihydrate ($Na_2[Fe(CN)_5NO].2H_2O$). Other suitable catalyst that contain iron can include, but are not limited to, Fe[EDTA], Fe[EDDS], Fe[DTPA], Fe[EGTA], Fe[CDTA], Fe[IDS], or any mixture thereof. In at least one specific embodiment, the catalyst preferably includes ferricyanide, e.g., potassium ferricyanide, a complex of iron and ethylenediaminetetraacetic acid (EDTA), a complex of iron and (S,S)-ethylenediamine-N,N'-disuccinic acid ((S,S)-EDDS), a complex of iron and (R,R)-ethylenediamine-N,N'-disuccinic acid ((R,R)-EDDS), a complex of iron and (R,S)-ethylenediamine-N,N'-disuccinic acid ((R,S)-EDDS), a complex of iron and diethylenetriaminepentaacetic acid (DTPA), a complex of iron and trans-1,2-diaminocyclohexane tetraacetic acid (DCTA), a complex of iron and iminodisuccinate (IDS), or any mixture thereof.

Tertiary amines can be represented by the general formula $NR_1R_2R_3$, where each $R_1$, $R_2$, and $R_3$ is independently selected from alkyls, cycloalkyls, heterocycloalkyls, aryls, heteroaryls, and substituted aryls. The alkyl can include branched or unbranched alkyls having from 1 to about 15 carbon atoms or more preferably from 1 to about 8 carbon atoms. Illustrative alkyls can include, but are not limited to, methyl, ethyl, n-propyl, isopropyl, n-butyl, sec butyl, t-butyl, n-pentyl, n-hexyl, and ethylhexyl. The cycloalkyls can include from 3 to 7 carbon atoms. Illustrative cycloalkyls can include, but are not limited to, cyclopentyl, substituted cyclopentyl, cyclohexyl, and substituted cyclohexyl. The term "aryl" refers to an aromatic substituent containing a single aromatic ring or multiple aromatic rings that are fused together, linked covalently, or linked to a common group such as a methylene or ethylene moiety. More specific aryl groups contain one aromatic ring or two or three fused or linked aromatic rings, e.g., phenyl, naphthyl, biphenyl, anthracenyl, phenanthrenyl, and the like. The aryl substituents can include from 1 to about 20 carbon atoms. The term "heteroatom-containing," as in a "heteroatom-containing cycloalkyl group," refers to a molecule or molecular fragment in which one or more carbon atoms is replaced with an atom other than carbon, e.g., nitrogen, oxygen, sulfur, phosphorus, boron, or silicon. Similarly, the term "heteroaryl" refers to an aryl substituent that is heteroatom-containing. The term "substituted," as in "substituted aryls," refers to a molecule or molecular fragment in which at least one hydrogen atom bound to a carbon atom is replaced with one or more substituents that are functional groups such as hydroxyl, alkoxy, alkylthio, phosphino, amino, halo, silyl, and the like. Illustrative tertiary amines can include, but are not limited to, trimethylamine, triethylamine, triethanolamine, or any combination thereof. Illustrative polymeric tertiary amines can include, but are not limited to, poly(N-methyl-diallyl amine), poly(N-dimethyl-vinyl amine), copolymers of N-dimethyl-vinyl amine, or any combination thereof. Illustrative polyamines can include, but are not limited to, diethylenetriamine ("DETA"), triethylenetetramine ("TETA"), tetraethylenepentamine ("TEPA"). Other polyamines can include, for example, 1,3-propanediamine, 1,4-butanediamine, polyamidoamines, and polyethylenimines.

Illustrative phosphates can be or include, but are not limited to, potassium, phosphate, sodium phosphate, ammonium phosphate, or any combination or mixture thereof. Illustrative bisulfites can include, but are not limited to, sodium bisulfite. Illustrative metabisulfites can be or include, but are not limited to, sodium metabisulfite, potassium metabisulfite, or any combination or mixture thereof. Illustrative cyanamides can include, but are not limited to, cyanamide, calcium cyanamide, sodium hydrogen cyanamide, or any combination thereof.

The amount of catalyst, if present in the free radical precursor, can widely vary. For example, the amount of catalyst in the mixture can be from a low of about 0.00001 wt %, about 0.0001 wt %, about 0.001 wt %, about 0.01 wt %, or about 0.1 wt % to about 0.5 wt %, about 1 wt %, about 3 wt %, about 5 wt %, about 10 wt %, or about 20 wt %, based on the dry weight of the lignocellulose substrates, with suitable ranges including the combination of any two values. In another example, the amount of catalyst in the mixture can be from about 0.01 wt % to about 1.5 wt %, about 0.1 wt % to about 1.3 wt %, about 0.05 wt % to about 0.5 wt %, about 0.07 wt % to about 0.4 wt %, about 0.05 wt % to about 5 wt %, based on the dry weight of the lignocellulose substrates. In another example, the amount of the catalyst in the mixture can be about 0.001 wt % to about 0.5 wt %, about 0.15 wt % to about 0.35 wt %, about 0.1 wt % to about 0.4 wt %, about 0.1 wt % to about 2 wt %, about 0.05 wt % to about 3 wt %, about 0.05 wt % to about 0.35 wt %, about 0.1 wt % to about 4.5 wt %, about 0.15 wt % to about 4 wt %, about 0.05 wt % to about 3 wt %, or about 0.01 wt % to about 3.5 wt %, based on the dry weight of the lignocellulose substrates.

In one or more embodiments, the amount of the metal, if present in the catalyst, that can remain bound to the complexing agent until the mixture is heated, e.g., to a temperature of about 60° C. to about 300° C., can be at least at least 11%, at least 13%, at least 15%, at least 20%, at least 25%, at least 30%, at least 35%, at least 40%, at least 45%, at least 50%, at least 55%, at least 60%, at least 65%, or at least 70% of the amount of metal that was initially present in the mixture and bound to the complexing agent. In another example, the amount of the metal, if present in the catalyst, that can remain bound to the complexing agent until the mixture is heated, e.g., to a temperature of about 60° C. to about 300° C., can be about 11% to about 95%, about 15% to about 85%, about 20% to about 90%, about 30% to about 80%, about 11% to about 100%, about 35% to about 75%, about 40% to about 70%, or about 30% to about 95% of the amount of the metal initially present in the mixture and bound to the complexing agent.

The catalyst, if combined with a liquid medium, can have a total concentration of solids ranging from about 0.001 wt % to about 99.9 wt %. Preferably, if the catalyst is combined with a liquid medium, the catalyst and liquid medium mixture can have a concentration of solids from a low of about 0.1 wt %, about 0.5 wt %, about 1 wt %, or about 2 wt % to a high of about 4 wt %, about 5 wt %, about 6 wt %, about 7 wt %, or about 8 wt %, based on the combined weight of the catalyst and the liquid medium, with suitable ranges including the combination of any two values.

The oxidant, if present in the free radical precursor, can be or include any suitable oxidant or combination of oxidants. The oxidant can be a solid, liquid, gas, or multi-phase. Illustrative oxidants can include, but are not limited to, inorganic and/or organic peroxy compounds, ozonides, halogen containing oxidants, or any combination thereof. Illustrative inorganic peroxy compounds can include, but are not limited to, hydrogen peroxide, hydrogen peroxide generating compounds, e.g., alkali metal salts of percarbonate, perborate, peroxysulfate, peroxyphosphate, and/or peroxysilicate, and/or corresponding weak acids. Illustrative organic peroxy compounds can include, but are not limited to, t-butyl peroxide, benzoyl peroxide, peroxy carboxylic acids, peracetic acid, perbenzoic acid, hydroperoxides, e.g., t-butyl hydroperoxides, or any combination or mixture thereof. Illustrative halogen containing oxidants can include, but are not limited to, alkali metal chlorite, alkali metal hypochlorite, chlorine dioxide, and/or a chloro sodium salt of cyanuric acid. An illustrative ozonide can include, but is not limited to, dimethyloxirane.

The oxidant can be combined with one or more liquid mediums. For example, the oxidant can be or include an aqueous solution of hydrogen peroxide. The concentration of oxidant, e.g., hydrogen peroxide, combined with a liquid medium, e.g., water, can be from a low of about 1 wt %, about 3 wt %, about 5 wt %, about 10 wt %, about 15 wt %, about 20 wt %, about 25 wt %, or about 30 wt % to a high of about 50 wt %, about 60 wt %, about 70 wt %, about 80 wt %, about 90 wt %, or about 98 wt %, based on the combined weight of the oxidant and the liquid medium, with suitable ranges including the combination of any two values.

The amount of oxidant present in the mixture can depend, at least in part, on the particular oxidant, catalyst, lignocellulose substrates, and/or, if present, the compound having at least two hydrogen atoms that are abstractable in the presence of hydroxyl radicals and, thus, can widely vary. For example, the amount of oxidant in the mixture can be from about 1 wt % to about 200 wt %, based on the dry weight of the lignocellulose substrates. In another example, the amount of oxidant in the mixture can be from a low of about 1 wt %, about 5 wt %, about 10 wt %, or about 20 wt % to a high of about 80 wt %, about 100 wt %, about 120 wt %, or about 150 wt %, based on the dry weight of the lignocellulose substrates, with suitable ranges including the combination of any two values. In another example, the oxidant can be present in the mixture in an amount from about 0.1 wt % to about 30 wt %, about 1 wt % to about 20 wt %, about 5 wt % to about 50 wt %, about 10 wt % to about 70 wt %, about 0.5 wt % to about 25 wt %, about 3 wt % to about 6 wt %, or about 2 wt % to about 8 wt %, based on the dry weight of the lignocellulose substrates. In still another example, the oxidant can be present in the mixture in amount of about 0.1 wt % to about 10 wt %, about 1 wt % to about 12 wt %, about 2 wt % to about 9 wt %, about 3 wt % to about 9 wt %, about 5 wt % to about 15 wt %, about 4 wt % to about 6 wt %, about 8 wt % to about 20 wt %, or about 2 wt % to about 10 wt %, based on the dry weight of the lignocellulose substrates.

In one or more embodiments, the amount of oxidant, if present as or in the free radical precursor, that can remain present until the resinated furnish is heated, e.g., to a temperature of about 60° C. to about 300° C., can be at least at least 11%, at least 13%, at least 15%, at least 20%, at least 25%, at least 30%, at least 35%, at least 40%, at least 45%, at least 50%, at least 55%, at least 60%, at least 65%, or at least 70% of the amount of oxidant initially present in the resinated furnish. In another example, the amount of the oxidant, if present in the free radical precursor, that can remain present until the resinated furnish is heated, e.g., to a temperature of about 60° C. to about 300° C., can be about 11% to about 95%, about 15% to about 85%, about 20% to about 90%, about 30% to about 80%, about 11% to about 100%, about 35% to about 75%, about 40% to about 70%, or about 30% to about 95% of the amount of the oxidant initially present in the resinated furnish.

The optional one or more compounds having at least two hydrogen atoms that are abstractable in the presence of hydroxyl radicals can be or include, but are not limited to, one or more lignins, one or more tannins, one or more novolac resins, one or more modified phenol formaldehyde resins, bis-phenol A, humic acids, or any combination or mixture thereof. If two or more compounds having at least two hydrogen atoms that are abstractable in the presence of hydroxyl radicals are present, the two or more compounds having at least two hydrogen atoms that are abstractable in the presence of hydroxyl radicals can be present in any amount with respect to one another. The one or more compounds having at least two hydrogen atoms that are abstractable in the presence of hydroxyl radicals can be in the form of a solid, a liquid, or a "two phase" or solid/liquid mixture.

The novolac resin can be produced by reacting a phenol component with an aldehyde component or aldehyde compound(s) in the presence of an acid catalyst. The phenol component of the novolac resin can include a variety of substituted phenolic compounds, unsubstituted phenolic compounds, or any combination of substituted and/or unsubstituted phenolic compounds. For example, the phenol component can be phenol itself, i.e., mono-hydroxy benzene. Examples of substituted phenols can include, but are not limited to, alkyl-substituted phenols such as the cresols and xylenols; cycloalkyl-substituted phenols such as cyclohexyl phenol; alkenyl-substituted phenols; aryl-substituted phenols such as p-phenyl phenol; alkoxy-substituted phenols such as 3,5-dimethyoxyphenol; aryloxy phenols such as p-phenoxy phenol; and halogen-substituted phenols such as p-chlorophenol. Dihydric phenols such as catechol, resorcinol, hydroquinone, bis-phenol A and bis-phenol F also can also be used. Specific examples of suitable phenolic compounds (phenol components) for replacing a portion or all of the phenol used in preparing a novolac resin can include, but are not limited to, bis-phenol A, bis-phenol F, o-cresol, m-cresol, p-cresol, 3,5-5 xylenol, 3,4-xylenol, 3,4,5-trimethylphenol, 3-ethyl phenol, 3,5-diethyl phenol, p-butyl phenol, 3,5-dibutyl phenol, p-amyl phenol, p-cyclohexyl phenol, p-octyl phenol, 3,5 dicyclohexyl phenol, p-phenyl phenol, p-phenol, 3,5-dimethoxy phenol, 3,4,5 trimethoxy phenol, p-ethoxy phenol, p-butoxy phenol, 3-methyl-4-methoxy phenol, p-phenoxy phenol, naphthol, anthranol and substituted derivatives thereof. Preferably, about 80 wt % or more, about 90 wt % or more, or about 95 wt % or more of the phenol component includes phenol (mono-hydroxy benzene).

Illustrative aldehyde compounds can include the so-called masked aldehydes or aldehyde equivalents, such as acetals or hemiacetals. Suitable aldehydes can be represented by the general formula R'CHO, where R' is a hydrogen or a hydrocarbon radical generally having 1-8 carbon atoms. Specific examples of suitable aldehyde compounds can include, but are not limited to, formaldehyde, acetaldehyde, propionaldehyde, butyraldehyde, furfuraldehyde, benzaldehyde, or any combination thereof. As used herein, the term "formaldehyde" can refer to formaldehyde, formaldehyde derivatives, other aldehydes, or combinations thereof. Preferably, the aldehyde component is formaldehyde. One or more difunctional aldehydes can also be used to produce the novolac resin, and could advantageously be used to introduce cross-links ultimately into the at least partially cured novolac resin.

The aldehyde can be used in many forms such as solid, liquid, and/or gas. Considering formaldehyde in particular, the formaldehyde can be or include paraform (solid, polymerized formaldehyde), formalin solutions (aqueous solutions of formaldehyde, sometimes with methanol, in 37 percent, 44 percent, or 50 percent formaldehyde concentrations), Urea-Formaldehyde Concentrate ("UFC"), and/or formaldehyde gas in lieu of or in addition to other forms of formaldehyde can also be used. In another example, the aldehyde can be or include a pre-reacted urea-formaldehyde mixture having a urea to formaldehyde weight ratio of about 1:2 to about 1:3.

A molar ratio of formaldehyde to phenol used to produce the novolac resin can be from about 0.5 to about 0.95 or more preferably from about 0.7 to about 0.85. The reaction between the phenol and the formaldehyde to produce the novolac resin can be carried out in the presence of an acid catalyst under acidic conditions. Suitable acid catalysts can include, but are not limited to, oxalic acid, sulfuric acid, p-toluene sulfuric acid, hydrochloric acid, salicylic acid, mineral acids and salts thereof, or any combination thereof. Mixed catalyst systems, such as ZnOAc/oxalic acid and other divalent metal compounds, e.g., acetates, can be used to prepare "high-ortho" novolac resins. Divalent metal compounds can include Ca, Mg, Zn, Cd, Pb, Cu, CO, and Ni. Preferred catalysts include oxalic acid, sulfuric acid, p-toluene sulfonic acid, and ZnOAc/oxalic acid. Most preferably, the catalyst is oxalic acid or ZnOAc/oxalic acid.

The amount of acid catalyst used to produce the novolac resin can be sufficient to catalyze the reaction between the phenol and formaldehyde to produce the novolac resin. The phenol/formaldehyde reaction can be conducted in about 1 to about 6 hours, e.g., in about 2 to about 4 hours. The phenol/formaldehyde reaction can be carried out at a temperature from about 80° C. to about 100° C., e.g., about 95° C. to about 100° C. The reaction can be carried out at atmospheric pressure, although increased pressure can be utilized to permit the application of higher temperatures and, therefore, faster reaction rates and accordingly shorter reaction times.

The novolac resin can be treated to remove water and/or other volatile organic materials by heating, such as by distillation. After this treatment, the free phenol can be about 0.001% to about 2.0%, preferably about 0.001% to about 0.5%. Distillation of the resulting novolac resin can be performed at atmospheric pressure by heating up to about 140° C., and then under a vacuum until the resin reaches a temperature of about 180° C. to about 220° C. Other suitable methods for treating the resin via heat can include thin-film evaporators. The resulting molten novolac resin can be cooled to a temperature below about 100° C.

If desired, the novolac resin can be neutralized. Neutralization of the novolac resin can be accomplished by the addition of one or more bases or base compounds, such as sodium hydroxide and/or potassium hydroxide, or its equivalent. The base compound can be added in an amount sufficient to raise the pH of the novolac resin to between about 5 to about 9, e.g., about 6 to about 8. Typically, about 10 wt % to about 30 wt % of water, based on the total resin solids, can be added. Suitable novolac resins and inverted novolac resins can be as discussed and described in U.S. Pat. No. 5,670,571 and U.S. Patent Application Publication No. 2008/0280787.

As used herein, the term "tannin" refers to both hydrolyzable tannins and condensed tannins As such, the compound having at least two hydrogen atoms that are abstractable in the presence of hydroxyl radicals can be or include hydrolyzable tannins, condensed tannins, or a combination of hydrolyzable tannins and condensed tannins Illustrative genera of shrubs and/or trees from which suitable tannins can be derived can include, but are not limited to, *Acacia, Castanea, Vachellia, Senegalia, Terminalia, Phyllanthus, Caesalpinia, Quercus, Schinopsis, Tsuga, Rhus, Juglans, Carya,* and *Pinus,* or any combination thereof. In another example, genera from which suitable tannins can be derived can include, but are not limited to, *Schinopsis, Acacia,* or a combination thereof. In another example, genera from which suitable tannins can be derived can include, but are not limited to, *Pinus, Carya,* or a combination thereof.

Hydrolyzable tannins are mixtures of simple phenols such as pyrogallol and ellagic acid and of esters of a sugar, e.g., glucose, with gallic and digallic acids. Illustrative hydrolyzable tannins can include, but are not limited to, extracts recovered from *Castanea sativa*, (e.g., chestnut), *Terminalia* and *Phyllantus* (e.g., myrabalans tree species), *Caesalpinia coriaria* (e.g., divi-divi), *Caesalpinia spinosa*, (e.g., tara), algarobilla, valonea, and *Quercus* (e.g., oak). Condensed tannins are polymers formed by the condensation of flavans. Condensed tannins can be linear or branched molecules. Illustrative condensed tannins can include, but are not limited to *Acacia mearnsii* (e.g., wattle or mimosa bark extract), *Schinopsis* (e.g., quebracho wood extract), *Tsuga* (e.g., hemlock bark extract), *Rhus* (e.g., sumach extract), *Juglans* (e.g., walnut), *Carya illinoinensis* (e.g., pecan), and *Pinus* (e.g., Radiata pine, Maritime pine, bark extract species).

The condensed tannins typically include about 70 wt % to about 80 wt % active phenolic ingredients (the "tannin fraction") and the remaining ingredients (the "non-tannin fraction") typically include, but are not limited to, carbohydrates, hydrocolloid gums, and amino and/or imino acid fractions. The condensed tannins can be used as recovered or extracted from the organic matter or the condensed tannins can be purified, e.g., about 95 wt % or more active phenolic ingredients. Hydrolyzable tannins and condensed tannins can be extracted from the starting material, e.g., trees and/or shrubs, using well established processes. A more detailed discussion of tannins is discussed and described in the *Handbook of Adhesive Technology*, Second Edition, CRC Press, 2003, chapter 27, "Natural Phenolic Adhesives I: Tannin," and in *Monomers, Polymers and Composites from Renewable Resources*, Elsevier, 2008, chapter 8, "Tannins Major Sources, Properties and Applications."

The condensed tannins can be classified or grouped into one of two main categories, namely, those containing a resorcinol unit and those containing a phloroglucinol unit. Illustrative tannins that include the resorcinol unit include, but are not limited to, black wattle tannins and quebracho tannins The resorcinol unit can be represented by Formula III below.

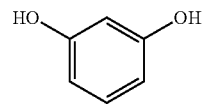

Formula III

The resorcinol group is shown within the box overlaying the unit structure of black wattle and quebracho tannins in Formula IV below. For simplicity, the structure of black wattle and quebracho tannins is represented by their flavonoid unit structure.

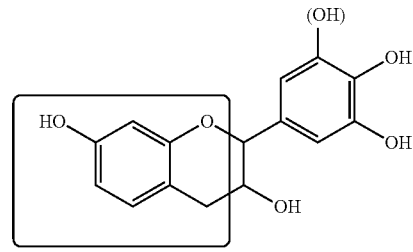

Formula IV

Illustrative tannins that include the phloroglucinol unit include, but are not limited to, pecan tannins and pine tannins The phloroglucinol unit can be represented by formula V below.

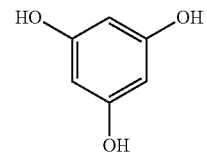

Formula V

The phloroglucinol unit is shown within the box overlaying the unit structure of pecan and pine tannins in Formula VI below. For simplicity, the structure of pecan and pine tannins is represented by their flavonoid unit structure.

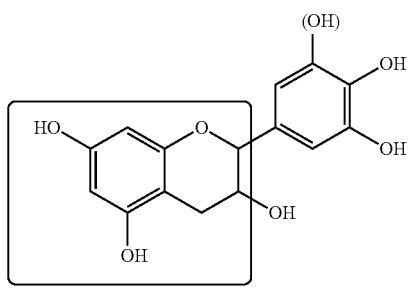

Formula VI

Phloroglucinol is known for higher reactivity than resorcinol. As such, tannins that include the phloroglucinol unit are more reactive than tannins that include the resorcinol unit.

The tannins can have an acidic pH. For example, the pH of the tannins can be from a low of about 3, about 3.5, or about 4 to a high of about 5, about 5.5, about 6, or about 6.5, with suitable ranges including the combination of any two values. The tannins can have resorcinol and/or phloroglucinol functional groups. Suitable, commercially available tannins can include, but are not limited to, black wattle tannin, quebracho tannin, hemlock tannin, sumach tannins, pecan tannin, mimosa tannin, pine tannins, or any combination thereof.

Illustrative modified phenol formaldehyde resins can include ARYLZENE®, which can be represented by the general Formula VII:

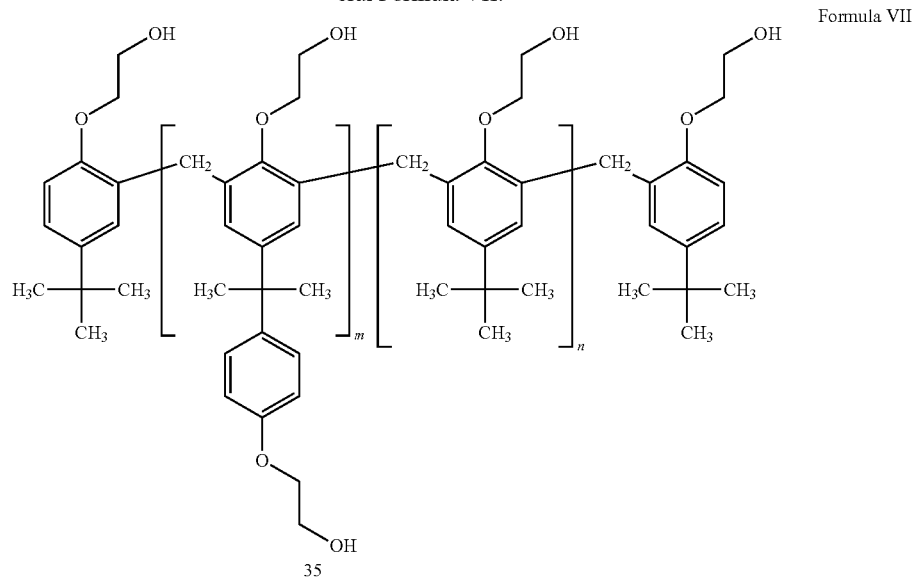

Formula VII where n=3 and 0.8<m<1.5.

Other illustrative modified phenol formaldehyde resins can be or include those discussed and described in U.S. Pat. Nos. 5,674,970; 5,739,259; 5,756,642; 5,756,655; 5,770,750; 5,773,552; 5,837,798; 5,889,137; 6,166,151; 6,291,077; 6,399,740; and 6,569,953.

Humic acid can be represented by the general Formula VIII:

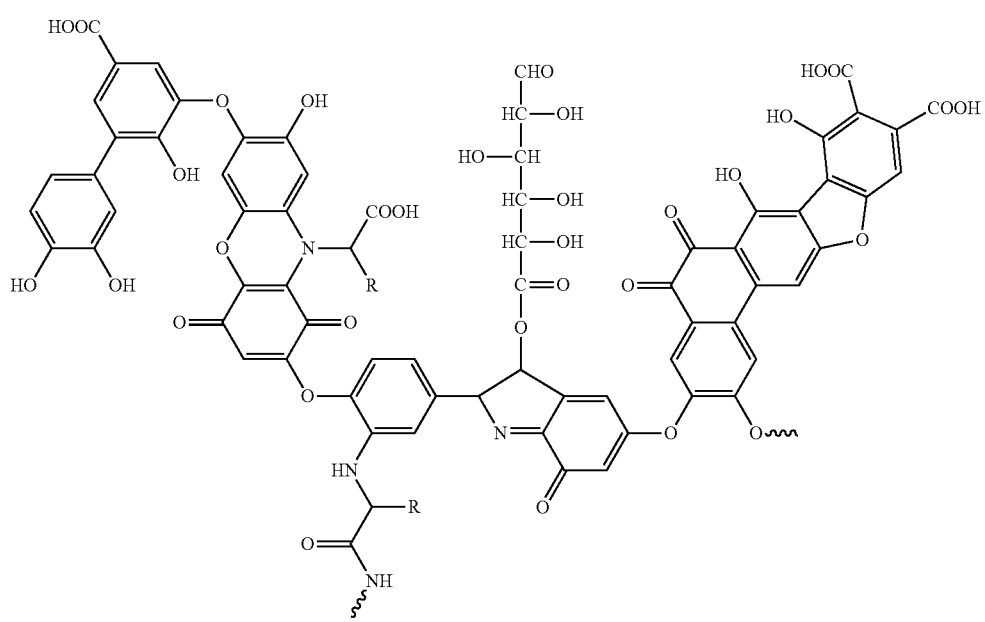

Formula VIII

The compound having at least two hydrogen atoms that are abstractable in the presence of hydroxyl radicals, e.g., the tannin, lignin, and/or novolac resin, can be combined with a liquid medium. The compound having at least two hydrogen atoms that are abstractable in the presence of hydroxyl radicals when combined with a liquid medium can have a total concentration of solids ranging from about 1 wt % to about 99 wt %. For example, the compound having at least two hydrogen atoms that are abstractable in the presence of hydroxyl radicals combined with a liquid medium can have a concentration of solids from a low of about 5 wt %, about 10 wt %, about 15 wt %, or about 20 wt % to a high of about 40 wt %, about 50 wt %, about 60 wt %, about 70 wt %, or about 80 wt %, based on the combined weight of the compound having at least two hydrogen atoms that are abstractable in the presence of hydroxyl radicals and the liquid medium. In another example, the compound having at least two hydrogen atoms that are abstractable in the presence of hydroxyl radicals combined with a liquid medium can have a concentration of solids from about 40% to about 60%, about 45% to about 55%, or about 47% to about 50%. In another example, the compound having at least two hydrogen atoms that are abstractable in the presence of hydroxyl radicals combined with a liquid medium can have a concentration of solids from about 10% to about 30%, about 15% to about 35%, about 20% to about 40%, about 25% to about 45%, about 20% to about 50%, or about 35% to about 55%.

Any one or more of the compounds having at least two hydrogen atoms that are abstractable in the presence of hydroxyl radicals can be modified with one or more compounds having one or more carbon-carbon double bonds and one or more reactive functional groups. For example, the resinated furnish can include one or more modified compounds having at least two hydrogen atoms that are abstractable in the presence of hydroxyl radicals produced by at least partially reacting one or more unsaturated monomers having one or more reactive functional groups with the one or more compounds having at least two hydrogen atoms that are abstractable in the presence of hydroxyl radicals, e.g., the lignin, tannin, novolac resin, modified phenol formaldehyde resin, bis-phenol A, and/or humic acid. Any suitable compounds having one or more carbon-carbon double bonds and one or more reactive functional groups or combination of compounds having one or more carbon-carbon double bonds and one or more reactive functional groups can be used to produce the modified compound having at least two hydrogen atoms that are abstractable in the presence of hydroxyl radicals. Preferably the compounds having one or more carbon-carbon double bonds and one or more reactive functional groups are nonionic. Illustrative compounds having one or more carbon-carbon double bonds and one or more reactive functional groups can include, but are not limited to, one or more unsaturated glycidyl ethers, one or more unsaturated glycidyl esters, one or more unsaturated mono-epoxides, one or more unsaturated methylol compounds, maleic anhydride, or any combination thereof.

Illustrative unsaturated glycidyl ethers can be represented by general formula IX:

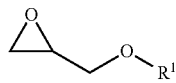

Formula IX where $R^1$ can be an ethylenically unsaturated radical such as vinyl, allyl, alkenyl, and the like. Suitable glycidyl ethers can include, but are not limited to, vinyl glycidyl ether, isopropenyl glycidyl ether, oleyl glycidyl ether, allyl glycidyl ether, p-vinylbenzyl glycidyl ether, o-allyl phenyl glycidyl ether, butenyl glycidyl ether, 4-vinylcyclohexyl glycidyl ether, abietylglycidyl ether, cyclohexeneylmethyl glycidyl ether, methallyl glycidyl ether, or any combination thereof.

Illustrative unsaturated glycidyl esters can be represented by general formula X:

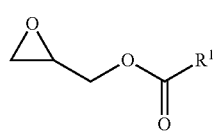

Formula X where $R^1$ can be an unsaturated, unsubstituted alkyl radical having from two to 19 carbon atoms. Suitable glycidyl esters can include, but are not limited to, glycidyl methacrylate, glycidyl acrylate, glycidyl crotonate, glycidyl oleate, di-glycidyl maleate, di-glycidyl fumarate, or any combination thereof.

Illustrative unsaturated mono-epoxides can include, but are not limited to, linear or cycloaliphatic epoxy compounds, where the unsaturation is terminal. Suitable unsaturated mono-epoxides can be represented by general Formula XI:

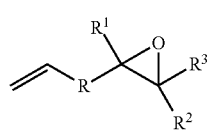

Formula XI where R can be a single bond or an alkylene optionally containing alkyl pendant groups; $R^1$, $R^2$, and $R^3$ can independently be hydrogen, alkyl straight, branched or cyclic, or any two of $R^1$, $R^2$, or $R^3$ can be alkylene and combined to form a 5 to 12 carbon cyclic ring, optionally containing alkyl pendants; and the number of carbon atoms in R, $R^1$, $R^2$, and $R^3$ can be such that the total number of carbon atoms in the epoxide is from 4 to 50. Suitable unsaturated mono-epoxides can include, but are not limited to, 4-vinyl cyclohexene oxide, 1-methyl-4-isopropenyl cyclohexene monoxide, butadiene monoxide, or any combination thereof.

Illustrative unsaturated methylol compounds can be represented by the general Formula XII:

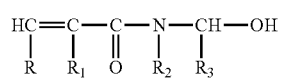

Formula XII where R, $R_1$, $R_2$, and $R_3$ can independently be hydrogen or a hydrocarbyl group, e.g., an alkyl group, containing from about 1 to about 6 carbon atoms. For example, an alkyl group can include from 1 to 4 carbon atoms. In at least one example, R, $R_1$, $R_2$, and $R_3$ can each independently be methyl or hydrogen. Suitable unsaturated methylol compounds can include, but are not limited to, N-methylol acrylamide, N-methylol methacrylamide, N-methylol crotonamide, or any combination thereof. The N-methylol ethylenically unsaturated amide can be in the form of an aqueous solution.

In at least one example, the modified compound having at least two hydrogen atoms that are abstractable in the presence of hydroxyl radicals can be free or essentially free of any anionic monomers. For example, the modified compound having at least two hydrogen atoms that are abstractable in the presence of hydroxyl radicals can contain less than about 3 wt %, less than about 2.5 wt %, less than about 2 wt %, less than about 1.5 wt %, less than about 1 wt %, less than about 0.7 wt %, less than about 0.5 wt %, less than about 0.3 wt %, less than about 0.1 wt %, less than about 0.05 wt %, or less than about 0.01 wt % anionic monomers. In at least one example, the modified compound having at least two hydrogen atoms that are abstractable in the presence of hydroxyl radicals can be free or essentially free of any ionic monomers. For example, the modified compound having at least two hydrogen atoms that are abstractable in the presence of hydroxyl radicals can contain less than about 3 wt %, less than about 2.5 wt %, less than about 2 wt %, less than about 1.5 wt %, less than about 1 wt %, less than about 0.7 wt %, less than about 0.5 wt %, less than about 0.3 wt %, less than about 0.1 wt %, less than about 0.05 wt %, or less than about 0.01 wt % ionic monomers. In at least one other example the modified compound having at least two hydrogen atoms that are abstractable in the presence of hydroxyl radicals can be free or essentially free of any anionic and ionic monomers. For example, the modified compound having at least two hydrogen atoms that are abstractable in the presence of hydroxyl radicals can contain less than about 3 wt %, less than about 2.5 wt %, less than about 2 wt %, less than about 1.5 wt %, less than about 1 wt %, less than about 0.7 wt %, less than about 0.5 wt %, less than about 0.3 wt %, less than about 0.1 wt %, less than about 0.05 wt %, or less than about 0.01 wt % anionic and ionic monomers. As used herein, the terms "essentially free of anionic monomers" and "essentially free of ionic monomers" means the modified compound having at least two hydrogen atoms that are abstractable in the presence of hydroxyl radicals does not include any intentionally added anionic monomers or ionic monomers, respectively. Said another way, the terms "essentially free of anionic monomers" and "essentially free of ionic monomers" means the modified compound having at least two hydrogen atoms that are abstractable in the presence of hydroxyl radicals may include anionic monomers and/or ionic monomers present as an impurity.

The amount of the compound having at least two hydrogen atoms that are abstractable in the presence of hydroxyl radicals, if present in resinated furnish, can widely vary. For example, the amount of the compound having at least two hydrogen atoms that are abstractable in the presence of hydroxyl radicals in the mixture can be from about 0.01 wt % to about 50 wt %, based on the dry weight of the lignocellulose substrates. In another example, the amount of the compound having at least two hydrogen atoms that are abstractable in the presence of hydroxyl radicals in the resinated furnish can be from a low of about 0.05 wt %, about 0.1 wt %, about 0.5 wt %, about 1 wt %, about 2 wt %, about 3 wt %, about 5 wt %, or about 7 wt % to a high of about 15 wt %, about 20 wt %, about 25 wt %, or about 30 wt %, based on the dry weight of the lignocellulose substrates, with suitable ranges including the combination of any two values. In another example, the amount of the compound having at least two hydrogen atoms that are abstractable in the presence of hydroxyl radicals in the resinated furnish can be from a low of about 0.1 wt %, about 0.5 wt %, about 1 wt %, about 3 wt %, or about 5 wt % to a high of about 10 wt %, about 13 wt %, about 15 wt %, about 17 wt %, or about 20 wt %, based on the dry weight of the lignocellulose substrates, with suitable ranges including the combination of any two values. In another example, the amount of the compound having at least two hydrogen atoms that are abstractable in the presence of hydroxyl radicals in the resinated furnish can be from about 1 wt % to about 15 wt %, about 5 wt % to about 15 wt %, about 8 wt % to about 13 wt %, about 7 wt % to about 12 wt %, or about 5 wt % to about 25 wt %, based on the dry weight of the lignocellulose substrates.

The lignocellulose substrates can include any one or more of the plant and vegetable materials discussed and described above with reference to the source for the lignins and tannins As used herein, the term "lignocellulose" refers to a material that includes lignin and cellulose, hemicelluose, or a combination of cellulose and hemicelluloses. The starting material, from which the lignocellulose substrates can be or can be derived from, can be shaped, reduced, or otherwise formed to the appropriate dimensions by various processes such as hogging, grinding, hammer milling, tearing, shredding, and/or flaking. Other processes for producing the substrates can include skiving, cutting, slicing, and/or sawing. Suitable forms of the lignocellulose substrates can include, but are not limited to, chips, flakes, wafers, fibers, powder, shavings, sawdust or dust, veneer, strands, and/or the like. Accordingly, the term "substrate" when used in conjunction with "lignocellulose" refers to lignocellulose material or lignocellulose containing material having any desired shape such as chips, flakes, fibers, powder, shavings, sawdust or dust, veneer, strands, and/or the like. Other suitable lignocellulose substrates can include, but are not limited to, wood chips, wood fibers, wood flakes, wood strands, wood wafers, wood shavings, wood particles, wood veneer, or any combination thereof.

The particular configuration of the substrates can be based, at least in part, on the desired product. For example, particulates such as chips, fibers, shavings, sawdust or dust, or the like can be preferred for producing particleboards, fiberboards, and the like. The substrates can have a length from a low of about 0.05 mm, about 0.1 mm, about 0.2 mm to a high of about 1 mm, about 5 mm, about 10 mm, about 20 mm, about 30 mm, about 40 mm, about 50 mm, or about 100 mm, with suitable ranges including the combination of any two values. In another example, veneers, i.e., layers or sheets of wood, can be used for producing plywood, laminated veneer lumber, and the like. The veneers can have a thickness from a low of about 0.8 mm, about 0.9 mm, about 1 mm, about 1.1 mm or about 1.2 mm to a high of about 3 mm, about 4 mm, about 5 mm, about 6 mm, about 7 mm, about 8 mm, about 9 mm, or about 10 mm, with suitable ranges including the combination of any two values.

The lignocellulose substrates can include liquid on, about, and/or within the substrates. For example, the lignocellulose substrates can have a liquid, e.g., moisture, content from a low of about 1 wt %, about 2 wt %, about 3 wt %, about 4 wt, or about 5 wt % to a high of about 7 wt %, about 9 wt %, about 11 wt %, about 13 wt %, about 15 wt %, about 17 wt %, about 19 wt %, about 21 wt %, about 23 wt %, about 25 wt %, about 27 wt %, about 29 wt %, about 31 wt %, about 33 wt %, about 35 wt %, or about 37 wt % based on a dry weight of the lignocellulose substrate, with suitable ranges including the combination of any two values. In another example, the lignocellulose substrates can have a liquid, e.g., moisture, content of about 1 wt % to about 10 wt %, about 2 wt % to about 4 wt %, about 2 wt % to about 3 wt %, about 3 wt % to about 6 wt %, about 5 wt % to about 10 wt %, about 6 wt % to about 8 wt %, or about 4 wt % to about 9 wt %. The lignocellulose substrates can be fresh, i.e., not treated or dried, or dried and/or treated. For example, the lignocellulose substrates and/or the starting material from which the lignocellulose substrates were derived can be at least partially dried. In another example, the lignocellulose substrates can be washed and/or leached with an aqueous medium such as water.

If any one or more of the components discussed and described herein include two or more different compounds, those two or more different compounds can be present in any ratio with respect to one another. Said another way, if the resinated furnish includes a first and a second type of lignocellulose substrate, free radical precursor, and/or compound having at least two hydrogen atoms that are abstractable in the presence of hydroxyl radicals the amount of the first and second components can be present in any desired ratio. For example, if the oxidant is present in the free radical precursor and includes a first oxidant and a second oxidant, the resinated furnish can have an oxidant composition that includes the first oxidant in an amount from about 1 wt % to about 99 wt % and conversely about 99 wt % to about 1 wt % of the second oxidant, based on the total weight of the oxidant composition, i.e., the total weight of the first and second oxidants. In another example, the amount of the first oxidant can be from a low of about 5 wt %, about 10 wt %, about 15 wt %, about 20 wt %, about 25 wt % about 30 wt %, about 35 wt %, about 40 wt %, or about 45 wt % to a high of about 60 wt %, about 65 wt %, about 70 wt %, about 75 wt %, about 80 wt %, about 85 wt %, about 90 wt %, or about 95 wt %, based on the total weight of the first and second oxidants.

One or more salts can optionally be combined with the lignocellulose substrates, the free radical precursor, the mixture of the hydrophobizing agent and the lignosulfonic acid or salt thereof, and the optional compound having at least two hydrogen atoms that are abstractable in the presence of hydroxyl radicals. The amount of salt in the mixture, if present, can be from a low of about 1 wt %, about 2 wt %, or about 3 wt % to a high of about 10 wt %, about 20 wt %, or about 30 wt %, based on the dry weight of the lignocellulose substrates, with suitable ranges including the combination of any two values. The one or more salts can be combined with the lignocellulose substrates, catalyst, and/or oxidant in any order or sequence. Illustrative salts can include, but are not limited to, Al, Ca, K, Na, Cu, Zn, Mg, Mn, Ba, and/or Li cations. Suitable anions can include, but are not limited to, carbonates, chlorides, nitrates, silicates, acetates, formates, sulphates, phosphates, and/or other forms.

Suitable oxidative binder systems can be or include those discussed and described in U.S. patent application having Ser. No. 61/708,395. Suitable binders also can include binders that do not require a free radical precursor as described herein. Such binders can include polyvinyl acetate polymers and copolymers, acrylic polymers and copolymers; styrene polymers and copolymers, aliphatic hydrocarbon polymers, vinyl halide polymers and copolymers, polyesters, polyamides, aminoplasts, epoxides, silcones, and polyurethanes, powder phenolic resin, or the binder can be a liquid phenolic or amino based resin, isocyanate resin, urea-formaldehyde ("UF"), phenol-formaldehyde resin, melamine-urea-formaldehyde ("MUF") resin, melamine-formaldehyde ("MF"), or melamine-urea-phenol formaldehyde ("MUPF") resin, and any mixture thereof. The binder can be free or essentially free of formaldehyde for use in the production of the composite products, e.g., lignocellulose products such as particleboard and plywood. As used herein, the term "essentially free of formaldehyde" means the mixture does not include or contain any intentionally added formaldehyde or compounds that can decompose, react, or otherwise form formaldehyde. Said another way, the term "essentially free of formaldehyde" means the resinated furnish does not contain formaldehyde or compounds that can form formaldehyde, but may include formaldehyde present as an impurity. Accordingly, depending on the particular multifunctional aldehyde(s) used to produce the mixtures discussed and described herein, the mixture can be referred to as "no added formaldehyde" or "NAF" mixture.

The binder that does not require a free radical precursor can be present in a concentration from a low of about 1 wt %, about 2.5 wt %, about 3.5 wt %, or about 4 wt %, to high of about 10 wt %, about 12.5 wt %, or about 25 wt %, based on the dry weight of composite. In another example, the binder that do not require a free radical precursor can be present in a concentration from about 1.5 wt % to about 2.5 wt %, about 1 wt % to about 15 wt %, about 2.5 wt % to about 6.5 wt %, about 5 wt % to about 14.5 wt %, or about 15 wt % to about 25 wt %, based on the dry weight of composite.

For the binders that do not require a free radical precursor, acids, bases, and metal catalysts can be used to at least partially cure the binder. Suitable acids can include, but are not limited to, sulfuric acid, maleic acid, lactic acid, acetic acid, formic acid, a urea/phenolsulfonic acid, toluene sulfonic acid, or any combination thereof. Suitable bases can include, but are not limited to, sodium hydroxide, ammonium hydroxide, ammonium sulfate, potassium hydroxide, triethylene tetraamine, diethylene triamine, triethylamine, urea, GP® 4590 k-20 precatalyst, made by Georgia-Pacific Chemicals LLC, or any combination thereof. Suitable metal catalysts can include, but are not limited to, salts of sodium, potassium, aluminum, magnesium, zinc, or any combination thereof. Other suitable catalysts can include, but are not limited to, sodium nitrate, aluminum sulfate, ammonium hydrogen phosphate, ammonium persulfate, ammonium chloride, ammonium nitrate, ammonium sulfate, or any combination thereof. Suitable metal catalysts can also include transition metals, transition metal salts, transition metal complexes, and mixtures thereof.

The amount of acid, base, or metal catalyst, if present, can widely vary. For example, the amount of catalyst in the resinated furnish can be from a low of about 0.00001 wt %, about 0.0001 wt %, about 0.001 wt %, about 0.01 wt %, or about 0.1 wt % to about 0.5 wt %, about 1 wt %, about 3 wt %, about 5 wt %, about 10 wt %, or about 20 wt %, based on the dry weight of the lignocellulose substrates, with suitable ranges including the combination of any two values. In another example, the amount of catalyst in the resinated furnish can be from about 0.01 wt % to about 1.5 wt %, about 0.1 wt % to about 1.3 wt %, about 0.05 wt % to about 0.5 wt %, about 0.07 wt % to about 0.4 wt %, about 0.05 wt % to about 5 wt %, based on the dry weight of the lignocellulose substrates. In another example, the amount of the catalyst in the resinated furnish can be about 0.001 wt % to about 0.5 wt %, about 0.15 wt % to about 0.35 wt %, about 0.1 wt % to about 0.4 wt %, about 0.1 wt % to about 2 wt %, about 0.05 wt % to about 3 wt %, about 0.05 wt % to about 0.35 wt %, about 0.1 wt % to about 4.5 wt %, about 0.15 wt % to about 4 wt %, about 0.05 wt % to about 3 wt %, or about 0.01 wt % to about 3.5 wt %, based on the dry weight of the lignocellulose substrates.

Illustrative composite products discussed and described herein can include, but are not limited to, particleboard, fiberboard such as medium density fiberboard ("MDF") and/or high density fiberboard ("HDF"), plywood such as hardwood plywood and/or softwood plywood, oriented strand board ("OSB"), laminated veneer lumber ("LVL"), laminated veneer boards ("LVB"), engineered wood flooring, and the like.

The method of making one or more composite products can include a continuous or semi-continuous blending process in which the lignocellulose substrates and the other components of the resinated furnish, e.g., the catalyst, oxidant, and the compound having at least two hydrogen atoms that are abstractable in the presence of hydroxyl radicals, can be introduced to a blender at a first or introduction region, end, area, or other location(s) configured to receive the components and the resinated furnish can be withdrawn from the blender via one or more recovery outlets. The blender can be configured to contain anywhere from a few hundred kilograms to several thousand kilograms. For example, in a single blender anywhere from a low of about 500 kg/hr, about 5,000 kg/hr, about 10,000 kg/hr, or about 13,000 kg/hr to a high of about 16,000 kg/hr, about 20,000 kg/hr, about 25,000 kg/hr, or about 30,000 kg/hr of the mixture can be recovered from the blender. As the resinated furnish exits the blender, the resinated furnish can be deposited onto a conveyor belt and can be transported to one or more dryers, moistening systems, presses, and/or other processing equipment. For example, in at least one specific embodiment, a particle board product can be made blending a first or "face" mixture and a second or "core" mixture in a first and second blend, respectively. The first blender can produce from about 13,600 kg/hr to about 15,900 kg/hr of a "face" mixture and the second blender can produce from about 18,100 kg/hr to about 20,400 kg/hr of a "core" mixture. The "face" and "core" mixtures can be used to produce a particleboard panel or sheet, where the "face" mixture makes up the outer layers of the particleboard and the "core" mixture makes up the inner or core layer of the particleboard.

Referring to particleboard in particular, particleboard made according to one or more embodiments discussed and described herein can meet or exceed the requirements for H-1, H-2, H-3, M-0, M-1, M-S, M-2, M-3i, LD-1, and/or LD-2 grade particleboard as described in the American National Standards Institute (ANSI) for particleboard, i.e., ANSI A208.1-2009 Particleboard, approved Feb. 2, 2009. Particleboard made according to one or more embodiments discussed and described herein can meet or exceed the requirements for PBU, D-2, D-3, and/or M-3 as defined by the ANSI for particleboard, i.e., ANSI A208.1-2009 Particleboard, approved Feb. 2, 2009. For example, Tables A and B set out certain requirements for the different grades of particleboard. Referring to oriented strand board (OSB) in particular, OSB made according to one or more embodiments discussed and described herein can meet or exceed the U.S. Department of Commerce Voluntary Performance Standard PS 2. Referring to plywood in particular, plywood made according to one or more embodiments discussed and described herein can meet or exceed the U.S. Department of Commerce Voluntary Performance Standard PS 1 and/or PS-2.

In one or more embodiments, one or more additives can be combined with the lignocellulose substrates, the mixture of free radical precursor, and optionally the compound having at least two hydrogen atoms or with the lignocellulose substrates, binder that does not require a free radical precursor, and the mixture of the hydrophobizing agent and the lignosulfonic acid or salt thereof to produce the resinated furnish. Illustrative additives can include, but are not limited to, waxes and/or other hydrophobic additives, water, filler material(s), extenders, surfactants, release agents, dyes, fire retardants, formaldehyde scavengers, biocides, or any combination thereof. For composite lignocellulose products, such as plywood, typical filler material(s) can include, but are not limited to, ground pecan and/or walnut shells, and typical extenders can include, for example, wheat flour. Other suitable extenders can include, but are not limited to, polysaccharides, and the like. Illustrative polysaccharides can include, but are not limited to, starch, cellulose, gums, such as guar and xanthan, alginates, pectin, gellan, or any combination thereof. Suitable polysaccharide starches can include, for example maize or corn, waxy maize, high amylose maize, potato, tapioca, and wheat starch. Other starches such as genetically engineered starches can include high amylose potato and potato amylopectin starches.

If one or more additives is present in the resinated furnish, the amount of each additive can be from a low of about 0.01 wt % to a high of 50 wt %, based on the total weight of the resinated furnish. For example, the amount of any given component or additive can be from a low of about 0.01 wt %, about 0.05 wt %, about 0.1 wt %, about 0.5 wt %, or about 1 wt % to a high of about 3 wt %, about 5 wt %, about 7 wt %, or about 9 wt %, based on the total weight of the resinated furnish. In another example, the amount of any given additive or component can be from a low of about 1 wt %, about 5 wt %, about 10 wt %, about 15 wt %, or about 20 wt % to a high of about 25 wt %, about 30 wt %, about 35 wt %, about 40 wt %, or about 45 wt %, based on the total weight of the resinated furnish. In at least one specific embodiment, one or more waxes, e.g., slack wax, can be present in the resinated furnish and the amount of wax can be from a low of about 0.1 wt %, about 0.5 wt %, or about 0.9 wt % to a high of about 1.5 wt %, about 2 wt %, or about 3 wt %, based on the dry weight of the lignocellulose substrates.

The composite product can have a density from a low of about 0.5 g/cm$^3$, about 0.55 g/cm$^3$, about 0.6 g/cm$^3$, about 0.63 g/cm$^3$, about 0.65 g/cm$^3$, about 0.67 g/cm$^3$, or about 0.7 g/cm$^3$ to a high of about 0.75 g/cm$^3$, about 0.77 g/cm$^3$, about 0.8 g/cm$^3$, about 0.83 g/cm$^3$, about 0.85 g/cm$^3$, about 0.88 g/cm$^3$, about 0.93 g/cm$^3$, about 0.97 g/cm$^3$, or about 1 g/cm$^3$. For example, the composite product can have a density of about 0.7 g/cm$^3$ to about 0.75 g/cm$^3$, about 0.65 g/cm$^3$ to about 0.85 g/cm$^3$, about 0.65 g/cm$^3$ to about 0.8 g/cm$^3$, about 0.67 g/cm$^3$ to about 0.77 g/cm$^3$, about 0.5 g/cm$^3$, to about 1 g/cm$^3$, about 0.5 g/cm$^3$, to about 0.8 g/cm$^3$, about 0.5 g/cm$^3$ to about 0.75 g/cm$^3$, or about 0.64 g/cm$^3$ to about 0.8 g/cm$^3$. In one or more embodiments, the composite product can have density less than 1 g/cm$^3$, less than 0.95 g/cm$^3$, less than 0.88 g/cm$^3$, less than 0.85 g/cm$^3$, less than 0.83 g/cm$^3$, less than 0.8 g/cm$^3$, less than 0.79 g/cm$^3$, less than 0.78 g/cm$^3$, less than 0.77 g/cm$^3$, less than 0.76 g/cm$^3$, less than 0.75 g/cm$^3$, less than 0.74 g/cm$^3$, or less than 0.73 g/cm$^3$.

The composite product can have an internal bond strength from a low of about 0.3 MPa, about 0.32 MPa, about 0.34 MPa, about 0.35 MPa, about 0.37 MPa, about 0.4 MPa, about 0.42 MPa, about 0.48 MPa, about 0.52 MPa, about 0.55 MPa, or about 0.58 MPa to a high of about 0.69 MPa, about 0.75 MPa, about 0.83 MPa, about 0.9 MPa, about 0.97 MPa, about 1.05 MPa, about 1.15 MPa, about 1.2 MPa, about 1.25 MPa, about 1.3 MPa, about 1.35 MPa, about 1.4 MPa, about 1.45 MPa, about 1.5 MPa, about 1.55 MPa, about 1.6 MPa, or about 1.7 MPa, with suitable ranges including the combination of any two values. For example, the composite product can have an internal bond strength of about 0.35 MPa to about 0.55 MPa, about 0.4 MPa to about 0.6 MPa, about 0.48 MPa to about 0.69 MPa, about 0.59 MPa to about 0.86 MPa, about 0.55 MPa to about 0.9 MPa, or about 0.51 MPa to about 0.85 MPa. In one or more embodiments, the composite product can have an internal bond strength of at least 0.33 MPa, at least 0.32 MPa, at least 0.34 MPa, at least 0.38 MPa, at least 0.41 MPa, at least 0.45 MPa, at least 0.48 MPa, at least 0.51 MPa, at least 0.55 MPa, at least 0.58 MPa, at least 0.62 MPa, at least 0.66 MPa, at least 0.69 MPa, at least 0.72 MPa, at least 0.76 MPa, or at least 0.79 MPa. The internal bond strength for each example can be determined according to the test procedure provided for in ASTM D1037-06a.

In one or more embodiments, the composite product can have a density less than 1 g/cm³, less than 0.95 g/cm³, less than 0.9 g/cm³, less than 0.85 g/cm³, less than 0.8 g/cm³, less than 0.79 g/cm³, less than 0.78 g/cm³, less than 0.77 g/cm³, less than 0.76 g/cm³, less than 0.75 g/cm³, less than 0.74 g/cm³, or less than 0.73 g/cm³ and an internal bond strength of at least 0.3 MPa, at least 0.35 MPa, at least 0.4 MPa, at least 0.48 MPa, at least 0.51 MPa, at least 0.55 MPa, at least 0.58 MPa, at least 0.62 MPa, at least 0.65 MPa, or at least 0.69 MPa. In at least one specific example, the composite product can have a density less than 0.8 g/cm³ and internal bond strength of at least 0.48 MPa. In at least one other specific example, the composite product can have a density less than 0.8 g/cm³ and internal bond strength of at least 0.69 MPa. In at least one other specific example, the composite product can have a density of less than 0.73 g/cm³ and internal bond strength of at least 0.48 MPa. In still another example, the composite product can have a density of less than 0.73 g/cm³ and internal bond strength of at least 0.58 MPa.

Composite products such as particleboard, fiberboard, plywood, and oriented strand board, can have a thickness or average thickness from a low of about 1.5 mm, about 5 mm, or about 10 mm to a high of about 15 mm, about 20 mm, about 25 mm, about 30 mm, about 50 mm, about 100 mm, about 200 mm, or about 300 mm, with suitable ranges including the combination of any two values. Composite products such as particleboard, fiberboard, plywood, and oriented strand board can have a length of about 0.1 m, about 0.5 m, about 1 m, about 1.2 m, about 1.8 m, about 2.4 m, about 3 m, or about 3.6 m. The composite products can also have a width of about 0.1 m, about 0.5 m, about 1 m, about 1.2 m, about 1.8 m, about 2.4 m, or about 3 m.

The composite products discussed and described herein can exhibit a low level of formaldehyde emission. A suitable test for determining formaldehyde emission from a composite product can include ASTM D6007-02 and AST E1333-10. For example, the composite products can exhibit a formaldehyde emission of zero. In another example, the composite products can exhibit a formaldehyde emission of less than about 1 part per million ("ppm"), less than about 0.9 ppm, less than about 0.08 ppm, less than about 0.07 ppm, less than about 0.06 ppm, less than about 0.05 ppm, less than about 0.04 ppm, less than about 0.03 ppm, less than about 0.02 ppm, less than about 0.01 ppm, or less than about 0.005 ppm.

The composite product can meet or exceed the formaldehyde emission standards required by the California Air Resources Board ("CARB") Phase 1 (less than 0.1 parts per million "ppm" formaldehyde for particleboard), and Phase 2 (less than 0.09 ppm formaldehyde for particleboard). The composite products discussed and described herein can also meet or exceed the formaldehyde emission standards required by the Japanese JIS/JAS F* (does not exceed 0.5 mg/L formaldehyde for particleboard), Japanese JIS/JAS F** (does not exceed 0.3 mg/L formaldehyde for particleboard), European E1, and European E2 standards.

In addition to the composite products discussed and described above, the mixture containing the hydrophobizing agent and lignosulfonic acid or salt thereof can be used for other types of products and/or applications, e.g., products and/or applications where hydrophobicity is needed or desired. For example, the mixture of the hydrophobizing agent and the lignosulfonic acid or salt thereof can be used in wood treatment applications, insulations, or coating applications, e.g., mortar, concrete, and paper. For such products the mixture of the hydrophobizing agent and the lignosulfonic acid or salt thereof can be present in about 0.1 wt % to about 7 wt %, based upon the total dry weight of the product.

EXAMPLES

In order to provide a better understanding of the foregoing discussion, the following non-limiting examples are offered. Although the examples may be directed to specific embodiments, they are not to be viewed as limiting the invention in any specific respect. All parts, proportions, and percentages are by weight unless otherwise indicated.

Example I

For Example 1, a mixture containing a hydrophobizing agent was prepared according to the following procedure. To 6,100 g of ammonium lignosulfonate (52-53% NVS) was added 151 g of paraffin wax and dispersed with a high-shear homogenizer (5,000 psi for 2 minutes recycling). A stable emulsion was formed with an average particle size of 0.440 µm. The emulsion contained 5 wt % paraffin wax based on the solid ammonium lignosulfonate and had 54.5% solids content. The emulsion had a viscosity 8,680 cP at a temperature of 25° C.

A particleboard panel was prepared with the mixture of Ex. 1 according to the following procedure. Face-grade particleboard wood furnish in the amount of 2,100 g from Southern Yellow Pine of a moisture content of 5-7 wt % was placed in 0.0283 m³ blender. For Example 1, while blending, the components of the binder system were applied in the form of a fine mist in the following order: a) 7 wt % of ammonium lignosulfonate containing 5 wt % of paraffin wax (48-49% aq.) mixed with 0.275 wt % FeEDTA; b) 5 wt % of hydrogen peroxide (50% aq.); c) 3 wt % of powdered ammonium lignosulfonate, where the amount of each component is based on the dry weight of the wood furnish. Resinated furnish (moisture content around 18 wt %) was blended for an additional 2 minutes. A 40.64×40.64×5.08 cm mat was formed and the board was pressed for 4 minutes at 166° C. (total press time of 240 seconds consisted of 30 seconds closing time, 180 seconds press time at 1,200 psi, and 30 seconds degas time) to stops configured to produce a 40.64×40.64 cm panel having thickness of 1.58±0.2 cm. Final board composites were cooled down to room temperature and internal bond (IB) strength, water absorption, and thickness swell were tested. Particleboard panels were also prepared with the mixtures of comparative examples C1 and C2 in the same manner, except in C1 no paraffin wax was used and in C2 an emulsion of slack wax was applied after the mixture of ALS, hydrogen peroxide, and catalyst. Table 1 below shows the results of the particleboard panels made with the mixtures of Ex. 1 and comparative examples C1 and C2.

TABLE 1

| Entry | % Loading ODW | | | | Density (g/cm³) | IB[2] (MPa) | Water Absorption[2] | Thickness Swell[2] |
| --- | --- | --- | --- | --- | --- | --- | --- | --- |
| | ALS[1] | Wax | $H_2O_2$ | Catalyst | | | | |
| C1 | 10% | 0 | 5% | 0.275% FeEDTA | 0.75 | 0.58 | 79.3% | 19.5% |
| C2 | 10% | 1.5%[3] | 5% | 0.17% $FeSO_4$ | 0.71 | 0.56 | 25.4% | 9.4% |

TABLE 1-continued

| Entry | % Loading ODW | | | | Density (g/cm³) | IB² (MPa) | Water Absorption² | Thickness Swell² |
|---|---|---|---|---|---|---|---|---|
| | ALS¹ | Wax | H$_2$O$_2$ | Catalyst | | | | |
| Ex. 1 | 10% | 0.35% | 5% | 0.275% FeEDTA | 0.73 | 0.46 | 26.0% | 4.0% |

¹Total amount of ammonium lignosulfonate (ALS) – 7% liquid + 3% powdered.
²Based on ASTM D1037-06a test method.
³Traditional slack wax emulsion wax was used.

As shown in Table 1 above, particleboard panel of Example 2 when compared to comparative example 1 and comparative example 2 surprisingly and unexpectedly exhibited a significant decrease in water absorption and thickness swell. More particularly, Example 1 had a 205% reduction in the percent water absorption as compared to C1 and comparable percent water absorption to C2. Example 1 also showed a 388% reduction in percent thickness swell as compared to C1 and a 135% reduction in the percent thickness swell as compared to C2. Such significant decreases in water absorption and thickness swell were not expected from using less wax to make the composite wood product.

Embodiments of the present disclosure further relate to any one or more of the following paragraphs:

1. A mixture, comprising lignosulfonic acid or salt thereof, a hydrophobizing agent, and water, wherein the lignosulfonic acid or salt thereof is present in an amount of from about 40 wt % to about 60 wt %, the hydrophobizing agent is present in an amount of from about 1 wt % to about 20 wt %, and the liquid medium is present in an amount of from about 20 wt % to about 59 wt %, wherein all weight percents are based on the combined weight of the lignosulfonic acid or salt thereof, the hydrophobizing agent, and the liquid medium.

2. The mixture according to paragraph 1, wherein the mixture is in the form of an emulsion, a dispersion, a suspension, or a solution.

3. The mixture according to paragraph 1 or 2, wherein the mixture is in the form of an emulsion.

4. The mixture according to any one of paragraphs 1 to 3, wherein the hydrophobizing agent comprises one or more rosins, one or more alkyl ketene dimers, one or more alkenyl-succinic anhydrides, one or more paraffin oils, one or more silicone oils, one or more vegetable oils, one or more hydrocarbon resins, turpentine, carene, thujene, sabinene, or any mixture thereof.

5. The mixture according to any one of paragraphs 1 to 4, wherein the hydrophobizing agent comprises petroleum wax, microcrystalline wax, slack wax, paraffin wax, montan wax, synthetic wax, carnauba wax, polyethylene wax, polypropylene wax, tetrafluoroethlyene wax, or any mixture thereof.

6. The mixture according to any one of paragraphs 1 to 5, wherein the salt of the lignosulfonic acid is present and comprises ammonium lignosulfonate, sodium lignosulfonate, potassium lignosulfonate, calcium lignosulfonate, magnesium lignosulfonate, or any mixture thereof.

7. The mixture according to any one of paragraphs 1 to 6, wherein the mixture comprises about 45 wt % to about 55 wt % of the lignosulfonic acid or the salt thereof, based on the combined weight of the lignosulfonic acid or salt thereof, the hydrophobizing agent, and the liquid medium.

8. The mixture according to any one of paragraphs 1 to 7, wherein the lignosulfonic acid or salt thereof is present in an amount of at least 40 wt %, based on the combined weight of the lignosulfonic acid or salt thereof, the hydrophobizing agent, and the liquid medium.

9. The mixture according to any one of paragraphs 1 to 8, wherein the hydrophobizing agent is present in an amount of from about 1 wt % to about 10 wt %, based on the combined weight of the lignosulfonic acid or salt thereof, the hydrophobizing agent, and the liquid medium.

10. The mixture according to any one of paragraphs 1 to 9, wherein the liquid medium is present in an amount of from about 25 wt % to about 35 wt %, based on the combined weight of the lignosulfonic acid or salt thereof, the hydrophobizing agent, and the liquid medium.

11. The mixture according to any one of paragraphs 1 to 10, wherein the mixture further comprises a free radical precursor.

12. The mixture according to any one of paragraphs 1 to 11, wherein the free radical precursor comprises a mixture of one or more oxidants and one or more catalysts.

13. The mixture according to any one of paragraphs 1 to 12, wherein the free radical precursor comprises a mixture of hydrogen peroxide and one or more iron containing catalysts.

14. The mixture according to any one of paragraphs 1 to 13, wherein the one or more catalysts comprises one or more metal ions of iron, copper, manganese, tungsten, molybdenum, cobalt, titanium, or any combination thereof one or more tertiary amines; polymeric tertiary amines; polyamines, or a combination thereof.

15. The mixture according to any one of paragraphs 1 to 14, wherein the one or more catalysts is selected from the group consisting of: potassium ferricyanide, iron ethylenediaminetetraacetic acid, iron (S,S)-ethylenediamine-N,N'-disuccinic acid, iron diethylenetriamine pentaacetic acid, iron ethlyleneglycol bis(2-aminoethylether)-N,N,N',N'-tetraacetic acid, iron trans-1,2-diaminocyclohexanetetraacetic acid, and any mixture thereof.

16. The mixture according to any one of paragraphs 1 to 15, wherein the free radical precursors comprises one or more catalysts, and wherein the one or more catalysts comprises one or more metals in the form of a complex bound to one or more complexing agents.

17. The mixture according to any one of paragraphs 1 to 16, wherein the one or more complexing agents comprises cyanide (CN$^-$), sulfate (SO$_4^{2-}$), ethylenediaminetetraacetic acid (EDTA), ethylenediamine-N,N'-disuccinic acid (EDDS), ethyleneglycol bis(2-aminoethylether)-N,N,N',N'-tetraacetic acid (EGTA), diethylenetriaminepentaacetic acid (DTPA), trans-1,2-diaminocyclohexane tetraacetic acid (CDTA), iminodisuccinate (IDS), nitrilotracetic acid (NTA), or any mixture thereof.

18. The mixture according to any one of paragraphs 1 to 17, wherein the free radical precursor comprises one or more azo compounds.

19. The mixture according to any one of paragraphs 1 to 18, wherein the free radical precursor comprises a compound having the general formula R—N=N—R', wherein R and R' are independently a substituted aryl or an substituted alkyl.

20. The mixture according to any one of paragraphs 1 to 19, wherein the one or more free radical precursors comprises azobisisobutyronitrile (AIBN).

21. The mixture according to any one of paragraphs 1 to 20, wherein the mixture further comprises a binder selected from the group consisting of: an isocyanate resin, a urea-formaldehyde, a phenol-formaldehyde resin, melamine-urea-formaldehyde resin, melamine-formaldehyde resin, or melamine-urea-phenol-formaldehyde resin, and any mixture thereof.

22. The mixture according to any one of paragraphs 1 to 21, wherein the mixture comprises a catalyst consisting of: a transition metal salt, a transition metal complex, and a mixture thereof.

23. The mixture according to any one of paragraphs 1 to 22, wherein the mixture comprises at least 50 wt % solids, based on the total weight of the mixture.

24. A method for making a mixture of a hydrophobizing agent and lignosulfonic acid or salt thereof, comprising: mixing lignosulfonic acid or salt thereof, a hydrophobizing agent, and a liquid medium to produce a mixture, wherein the mixture comprises about 40 wt % to about 60 wt % of the lignosulfonic acid or salt thereof, about 1 wt % to about 20 wt % of the hydrophobizing agent, and about 20 wt % to about 59 wt % of the liquid medium, wherein all weight percents are based on the combined weight of the lignosulfonic acid or salt thereof, the hydrophobizing agent, and the liquid medium; and emulsifying the mixture to produce an emulsion of the hydrophobizing agent and lignosulfonic acid or salt thereof.

25. The method according to paragraph 24, wherein the emulsion of the hydrophobizing agent and lignosulfonic acid or salt thereof contains particles with an average particle size of about 150 nm to about 2,000 nm.

26. The method of according to paragraph 24 or 25, wherein the emulsion of the hydrophobizing agent and lignosulfonic acid or salt thereof contains particles with an average particle size from about 50 nm to about 300 nm.

27. The method according to any one of paragraphs 24 to 26, wherein the emulsion of the hydrophobizing agent and the lignosulfonic acid or salt thereof contains particles with an average particle size of about 160 nm to about 1,000 nm.

28. The method according to any one of paragraphs 24 to 27, wherein the emulsion of the hydrophobizing agent and the lignosulfonic acid or salt thereof is mixed with one or more oxidants and one or more catalysts.

29. The method according to any one of paragraphs 24 to 28, wherein the emulsion of the hydrophobizing agent and the lignosulfonic acid or salt thereof is mixed with a catalyst selected from the group consisting of: a transition metal salt, a transition metal complex, and a mixture thereof.

30. A method for making a composite product, comprising: comprising: mixing a plurality of lignocellulose substrates, a binder, and a mixture comprising a lignosulfonic acid or salt thereof, a hydrophobizing agent, and a liquid medium to produce a resinated furnish, wherein the lignosulfonic acid or salt thereof is present in an amount of about 40 wt % to about 60 wt %, the hydrophobizing agent is present in an amount of about 1 wt % to about 20 wt %, and the liquid medium is present in an amount of about 20 wt % to about 59 wt %, wherein all weight percents based on the combined weight of the lignosulfonic acid or salt thereof, the hydrophobizing agent, and the liquid medium; and heating the resinated furnish to produce a composite product.

31. The method according to paragraph 30, wherein the binder comprises a free radical precursor.

32. The method according to paragraph 30 or 31, wherein the free radical precursor comprises a mixture of one or more oxidants and one or more catalysts.

33. The method according to any one of paragraphs 30 to 32, wherein the free radical precursor comprises a mixture of hydrogen peroxide and one or more iron containing catalysts.

34. The method according to any one of paragraphs 30 to 33, wherein the one or more catalysts comprises one or more metal ions of iron, copper, manganese, tungsten, molybdenum, cobalt, titanium, or any combination thereof; one or more tertiary amines; polymeric tertiary amines; polyamines, or a combination thereof.

35. The method according to any one of paragraphs 30 to 34, wherein the one or more catalysts is selected from the group consisting of: potassium ferricyanide, iron ethylenediaminetetraacetic acid, iron (S,S)-ethylenediamine-N,N'-disuccinic acid, iron diethylenetriamine pentaacetic acid, iron ethlyleneglycol bis(2-aminoethylether)-N,N,N',N'-tetraacetic acid, iron trans-1,2-diaminocyclohexanetetraacetic acid, and any mixture thereof.

36. The method according to any one of paragraphs 30 to 35, wherein the free radical precursors comprises one or more catalysts, and wherein the one or more catalysts comprises one or more metals in the form of a complex bound to one or more complexing agents.

37. The method according to any one of paragraphs 30 to 36, wherein the one or more complexing agents comprises cyanide ($CN^-$), sulfate ($SO_4^{2-}$), ethylenediaminetetraacetic acid (EDTA), ethylenediamine-N,N'-disuccinic acid (EDDS), ethyleneglycol bis(2-aminoethylether)-N,N,N',N'-tetraacetic acid (EGTA), diethylenetriaminepentaacetic acid (DTPA), trans-1,2-diaminocyclohexane tetraacetic acid (CDTA), iminodisuccinate (IDS), nitrilotracetic acid (NTA), or any mixture thereof.

38. The method according to any one of paragraphs 30 to 37, wherein the free radical precursor comprises a one or more oxidants and one or more azo compounds.

39. The method according to any one of paragraphs 30 to 38, wherein the free radical precursor comprises a compound having the general formula R—N=N—R', wherein R and R' is independently a substituted aryl or an substituted alkyl.

40. The method according to any one of paragraphs 30 to 39, wherein the one or more free radical precursors comprises azobisisobutyronitrile (AIBN).

41. The method according to any one of paragraphs 30 to 40, the binder comprises an isocyanate resin, a urea-formaldehyde, a phenol-formaldehyde resin, melamine-urea-formaldehyde resin, melamine-formaldehyde resin, melamine-urea-phenol-formaldehyde resin, or any mixture thereof.

42. The method according to any one of paragraphs 30 to 41, wherein the binder further comprises a catalyst selected from the group consisting of: a transition metal salt, a transition metal complex, and a mixture thereof.

43. The method according to any one of paragraphs 30 to 42, further comprising: maintaining the resinated furnish at a temperature of less than 60° C. for at least 10 minutes; and heating the resinated furnish to a temperature of at least 60° C. to about 300° C. to produce a composite product having a density less than 1 g/cm³ and an internal bond strength of at least 0.35 MPa, wherein at least 1 wt % of the one or more free radical precursors is present when the resinated furnish is heated to at least 60° C., based on a dry weight of the plurality of lignocellulose substrates.

44. A composite product, comprising: at least partially cured resinated furnish, wherein, prior to curing, the resinated furnish comprising a plurality of lignocellulose substrates, a binder, and a mixture comprising a hydrophobizing agent, a liquid medium, and lignosulfonic acid or salt thereof, wherein the lignosulfonic acid or salt thereof is present in an amount of about 40 wt % to about 60 wt %, the hydrophobizing agent is present in an amount of about 1 wt % to about 20 wt %, and the liquid medium is present in an amount of about 20 wt % to about 59 wt %, based on the combined weight of the lignosulfonic acid or salt thereof, hydrophobizing agent, and the liquid medium.

45. The composite product according to paragraph 44, wherein the at least partially cured binder comprises a free radical precursor.

46. The composite product according to paragraph 44 or 45, wherein the at least partially cured free radical precursor comprises a mixture of one or more oxidants and one or more catalysts.

47. The composite product according to any one of paragraphs 44 to 46, wherein the at least partially cured free radical precursor comprises a mixture of hydrogen peroxide and one or more iron containing catalysts.

48. The composite product according to any one of paragraphs 44 to 47, wherein the one or more catalysts comprises one or more metal ions of iron, copper, manganese, tungsten, molybdenum, cobalt, titanium, or any combination thereof one or more tertiary amines; polymeric tertiary amines; polyamines, or a combination thereof.

49. The composite product according to any one of paragraphs 44 to 48, wherein the one or more catalysts is selected from the group consisting of: potassium ferricyanide, iron ethylenediaminetetraacetic acid, iron (S,S)-ethylenediamine-N,N'-disuccinic acid, iron diethylenetriamine pentaacetic acid, iron ethlyleneglycol bis(2-aminoethylether)-N,N,N',N'-tetraacetic acid, iron trans-1,2-diaminocyclohexanetetraacetic acid, and any mixture thereof.

50. The composite product according to any one of paragraphs 44 to 49, wherein the at least partially cured free radical precursor comprises one or more catalysts, and wherein the one or more catalysts comprises one or more metals in the form of a complex bound to one or more complexing agents.

51. The composite product according to any one of paragraphs 44 to 50, wherein the one or more complexing agents comprises cyanide ($CN^-$), sulfate ($SO_4^{2-}$), ethylenediaminetetraacetic acid (EDTA), ethylenediamine-N,N'-disuccinic acid (EDDS), ethyleneglycol bis(2-aminoethylether)-N,N,N',N'-tetraacetic acid (EGTA), diethylenetriaminepentaacetic acid (DTPA), trans-1,2-diaminocyclohexane tetraacetic acid (CDTA), iminodisuccinate (IDS), nitrilotracetic acid (NTA), or any mixture thereof.

52. The composite product according to any one of paragraphs 44 to 51, wherein the at least partially cured binder comprises one or more oxidants and one or more azo compounds.

53. The composite product according to any one of paragraphs 44 to 52, wherein the at least partially cured binder comprises a compound having the general formula R—N=N—R', wherein R and R' is independently an substituted aryl or an substituted alkyl.

54. The composite product according to any one of paragraphs 44 to 53, wherein the one or more free radical precursors comprises azobisisobutyronitrile (AIBN).

55. The composite product according to any one of paragraphs 44 to 54, wherein the at least partially cured binder is selected from a group consisting of: an isocyanate resin, a urea-formaldehyde, a phenol-formaldehyde resin, melamine-urea-formaldehyde resin, melamine-formaldehyde resin, or melamine-urea-phenol-formaldehyde resin, and any mixture thereof.

56. A method for making a composite product, comprising: mixing a plurality of lignocellulose substrates, a free radical precursor, and a mixture comprising a hydrophobizing agent, a liquid medium, and lignosulfonic acid or salts thereof, to produce a resinated furnish, wherein the lignosulfonic acid or salt thereof is present in an amount of about 40 wt % to about 60 wt %, the hydrophobizing agent is present in an amount of about 1 wt % to about 20 wt %, and the liquid medium is present in an amount of about 20 wt % to about 59 wt %, wherein all weight percents based on the combined weight of the lignosulfonic acid or salts thereof, hydrophobizing agent, and the liquid medium; contacting the resinated furnish with hydrogen peroxide; and heating the resinated furnish to produce a composite product.

57. The method according to paragraph 56, wherein the resinated furnish further comprises compounds comprising at least two hydrogen atoms that are abstractable in the presence of hydroxyl radicals.

58. The method according to paragraph 56 or 57, wherein the free radical precursor comprises one or more catalysts.

59. The method according to any one of paragraphs 56 to 58, wherein the free radical precursor comprises a mixture of one or more oxidants and one or more catalysts.

60. The method according to any one of paragraphs 56 to 59, wherein the free radical precursor comprises one or more iron containing catalysts.

61. The method according to any one of paragraphs 56 to 60, wherein the one or more catalysts comprises one or more metal ions of iron, copper, manganese, tungsten, molybdenum, cobalt, titanium, or any combination thereof; one or more tertiary amines; polymeric tertiary amines; polyamines, or a combination thereof.

62. The method according to any one of paragraphs 56 to 61, wherein the one or more catalysts is selected from the group consisting of: potassium ferricyanide, iron ethylenediaminetetraacetic acid, iron (S,S)-ethylenediamine-N,N'-disuccinic acid, iron diethylenetriamine pentaacetic acid, iron ethlyleneglycol bis(2-aminoethylether)-N,N,N',N'-tetraacetic acid, iron trans-1,2-diaminocyclohexanetetraacetic acid, and any mixture thereof.

63. The method according to any one of paragraphs 56 to 62, wherein the free radical precursors comprises one or more catalysts, and wherein the one or more catalysts comprises one or more metals in the form of a complex bound to one or more complexing agents.

64. The method according to any one of paragraphs 56 to 63, wherein the one or more complexing agents comprises cyanide ($CN^-$), sulfate ($SO_4^{2-}$), ethylenediaminetetraacetic acid (EDTA), ethylenediamine-N,N'-disuccinic acid (EDDS), ethyleneglycol bis(2-aminoethylether)-N,N,N',N'-tetraacetic acid (EGTA), diethylenetriaminepentaacetic acid (DTPA), trans-1,2-diaminocyclohexane tetraacetic acid (CDTA), iminodisuccinate (IDS), nitrilotracetic acid (NTA), or any mixture thereof.

65. A method for making a composite product, comprising: mixing a plurality of lignocellulose substrates; a compound having a general formula R—N=N—R', wherein R and R' are independently a substituted aryl or a substituted alkyl; lignosulfonic acid or salts thereof; and a mixture comprising a hydrophobizing agent, a liquid medium, and lignosulfonic acid or salts thereof, wherein the lignosulfonic acid or salt thereof is present in an amount of about 40 wt % to about 60 wt %, the hydrophobizing agent is present in an amount of about 1 wt % to about 20 wt %, and the liquid medium is present in an amount of about 20 wt % to about 59 wt %, wherein all weight percents based on the combined weight of the lignosulfonic acid or salts thereof, hydrophobizing agent, and the liquid medium, to produce a resinated furnish; contacting the resinated furnish with hydrogen peroxide; and heating the resinated furnish to produce a composite product.

66. The method according to paragraph 65, wherein the compound having a general formula R—N=N—R' comprises azobisisobutyronitrile (AIBN).

67. The mixture, method, or composite product according to any one of paragraphs 1 to 66, wherein the liquid medium comprises water, methanol, ethanol, propanol, isopropanol, n-butanol, sec-butanol, isobutanol, tert-butanol, ethylene glycol, dimethyl ether, diethyl ether, tetrahydrofuran, or any mixture of thereof.

68. The mixture, method, or composite product according to any one of paragraphs 1 to 67, wherein the liquid medium is water.

69. A composition, comprising about 40 wt % to about 60 wt % lignosulfonic acid or a salt thereof, about 1 wt % to about 20 wt % of a hydrophobizing agent, and about 20 wt % to about 59 wt % of a liquid medium, wherein all weight percents are based on the combined weight of the lignosulfonic acid or salt thereof, the hydrophobizing agent, and the liquid medium.

70. A method for making a composite product, comprising: mixing a plurality of lignocellulose substrates, a binder, and a mixture comprising a lignosulfonic acid or a salt thereof, a hydrophobizing agent, and a liquid medium to produce a resinated furnish, wherein the mixture comprises about 40 wt % to about 60 wt % of the lignosulfonic acid or salt thereof, about 1 wt % to about 20 wt % of the hydrophobizing agent, and about 20 wt % to about 59 wt % of the liquid medium, wherein all weight percents are based on the combined weight of the lignosulfonic acid or salt thereof, the hydrophobizing agent, and the liquid medium; and heating the resinated furnish to produce a composite product.

71. A composite product, comprising: an at least partially cured resinated furnish, wherein, prior to curing, the resinated furnish comprises a plurality of lignocellulose substrates, a binder, and a mixture comprising lignosulfonic acid or a salt thereof, a hydrophobizing agent, a liquid medium, wherein the mixture comprises about 40 wt % to about 60 wt % of the lignosulfonic acid or salt thereof, about 1 wt % to about 20 wt % of the hydrophobizing agent, and about 20 wt % to about 59 wt % of the liquid medium, wherein all weight percents are based on the combined weight of the lignosulfonic acid or salt thereof, the hydrophobizing agent, and the liquid medium.

72. The composition, method, or composite product according to any one of paragraphs 69 to 71, wherein the hydrophobizing agent comprises one or more rosins, one or more alkyl ketene dimers, one or more alkenylsuccinic anhydrides, one or more paraffin oils, one or more silicone oils, one or more vegetable oils, one or more animal fats, one or more hydrocarbon resins, turpentine, carene, thujene, sabinene, or any mixture thereof.

73. The composition, method, or composite product according to any one of paragraphs 69 to 72, wherein the hydrophobizing agent comprises petroleum wax, microcrystalline wax, slack wax, paraffin wax, montan wax, synthetic wax, carnauba wax, polyethylene wax, polypropylene wax, tetrafluoroethlyene wax, or any mixture thereof.

74. The composition, method, or composite product according to any one of paragraphs 69 to 73, wherein the salt of the lignosulfonic acid is present and comprises ammonium lignosulfonate, sodium lignosulfonate, potassium lignosulfonate, calcium lignosulfonate, magnesium lignosulfonate, or any mixture thereof.

75. The composition, method, or composite product according to any one of paragraphs 69 to 74, wherein the mixture further comprises a free radical precursor.

76. The composition, method, or composite product according to paragraph 75, wherein the free radical precursor comprises a mixture of one or more oxidants and one or more catalysts.

77. The composition, method, or composite product according to paragraph 75, wherein the free radical precursor comprises a mixture of hydrogen peroxide and one or more iron containing catalysts.

78. The composition, method, or composite product according to paragraph 75, wherein the free radical precursor comprises one or more azo compounds.

79. The composition according to any one of paragraphs 69 or 72 to 78, wherein the mixture further comprises an isocyanate resin, a urea-formaldehyde resin, a phenol-formaldehyde resin, a melamine-urea-formaldehyde resin, a melamine-formaldehyde resin, a melamine-urea-phenol-formaldehyde resin, or any mixture thereof.

80. The composition, method, or composite product according to any one of paragraphs 69 to 79, wherein the liquid medium comprises water, methanol, ethanol, propanol, isopropanol, n-butanol, sec-butanol, isobutanol, tert-butanol, ethylene glycol, dimethyl ether, diethyl ether, tetrahydrofuran, or any mixture of thereof.

81. The composition according to any one of paragraphs 69 or 72 to 80, further comprising a free radical precursor comprising a mixture of hydrogen peroxide and an iron containing catalyst, wherein the salt of the lignosulfonic acid is present and comprises ammonium lignosulfonate, sodium lignosulfonate, potassium lignosulfonate, calcium lignosulfonate, magnesium lignosulfonate, or any mixture thereof, wherein the hydrophobizing agent comprises a rosin, an alkyl ketene dimer, an alkenylsuccinic anhydride, a paraffin oil, a silicone oil, a vegetable oil, an animal fat, a hydrocarbon resin, turpentine, carene, thujene, sabinene, or any mixture thereof, and wherein the liquid medium comprises water.

82. The method or composite product according to any one of paragraphs 70 to 78 or 80, wherein the binder comprises a free radical precursor comprising a mixture of hydrogen peroxide and an iron containing catalyst, wherein the salt of the lignosulfonic acid is present and comprises ammonium lignosulfonate, sodium lignosulfonate, potassium lignosulfonate, calcium lignosulfonate, magnesium lignosulfonate, or any mixture thereof, wherein the hydrophobizing agent comprises a rosin, an alkyl ketene dimer, an alkenylsuccinic anhydride, a paraffin oil, a silicone oil, a vegetable oil, an animal fat, a hydrocarbon resin, turpentine, carene, thujene, sabinene, or any mixture thereof, and wherein the liquid medium comprises water.

83. The method or composite product according to any one of paragraphs 70 to 78 or 80, wherein the binder comprises a free radical precursor.

84. The method or composite product according to paragraph 83, wherein the free radical precursor comprises a mixture of hydrogen peroxide and one or more iron containing catalysts.

85. The method or composite product according to any one of paragraphs 70 to 78, 80, or 82 to 84, the binder comprises an isocyanate resin, a urea-formaldehyde resin, a phenol-formaldehyde resin, a melamine-urea-formaldehyde resin, a melamine-formaldehyde resin, a melamine-urea-phenol-formaldehyde resin, or any mixture thereof.

86. The method according to any one of paragraphs 70 or 72 to 78, 80, or 82 to 85, further comprising: maintaining the resinated furnish at a temperature of less than 60° C. for at least 10 minutes; and heating the resinated furnish to a temperature of at least 60° C. to about 300° C. to produce a composite product having a density less than 1 g/cm$^3$ and an internal bond strength of at least 0.35 MPa, wherein at least 1 wt % of the one or more free radical precursors is present when the resinated furnish is heated to at least 60° C., based on a dry weight of the plurality of lignocellulose substrates.

Certain embodiments and features have been described using a set of numerical upper limits and a set of numerical lower limits. It should be appreciated that ranges including the combination of any two values, e.g., the combination of any lower value with any upper value, the combination of any two lower values, and/or the combination of any two upper values are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:

1. A method for making a composite product, comprising:
   mixing a plurality of lignocellulose substrates, a binder, and a mixture comprising a lignosulfonic acid or a salt thereof, a hydrophobizing agent, and a liquid medium to produce a resinated furnish, wherein the mixture comprises about 40 wt % to about 60 wt % of the lignosulfonic acid or salt thereof, about 1 wt % to about 20 wt % of the hydrophobizing agent, and about 20 wt % to about 59 wt % of the liquid medium, wherein all weight percents are based on the combined weight of the lignosulfonic acid or salt thereof, the hydrophobizing agent, and the liquid medium; and
   heating the resinated furnish to produce a composite product.

2. The method of claim 1, wherein the binder comprises a free radical precursor.

3. The method of claim 2, wherein the free radical precursor comprises a mixture of hydrogen peroxide and one or more iron containing catalysts.

4. The method of claim 1, wherein the binder comprises an isocyanate resin, a urea-formaldehyde resin, a phenol-formaldehyde resin, a melamine-urea-formaldehyde resin, a melamine-formaldehyde resin, a melamine-urea-phenol-formaldehyde resin, or any mixture thereof.

5. The method of claim 2, further comprising:
   maintaining the resinated furnish at a temperature of less than 60° C. for at least 10 minutes; and
   heating the resinated furnish to a temperature of at least 60° C. to about 300° C. to produce a composite product having a density less than 1 g/cm³ and an internal bond strength of at least 0.35 MPa, wherein at least 1 wt % of the one or more free radical precursors is present when the resinated furnish is heated to at least 60° C., based on a dry weight of the plurality of lignocellulose substrates.

6. The method of claim 1, wherein the hydrophobizing agent comprises one or more rosins, one or more alkyl ketene dimers, one or more alkenylsuccinic anhydrides, one or more paraffin oils, one or more silicone oils, one or more vegetable oils, one or more animal fats, one or more hydrocarbon resins, turpentine, carene, thujene, sabinene, or any mixture thereof.

7. The method of claim 1, wherein the hydrophobizing agent comprises petroleum wax, montan wax, synthetic wax, carnauba wax, or any mixture thereof.

8. The method of claim 1, wherein the mixture comprises the salt of the lignosulfonic acid, and wherein the salt of the lignosulfonic acid comprises ammonium lignosulfonate, sodium lignosulfonate, potassium lignosulfonate, calcium lignosulfonate, magnesium lignosulfonate, or any mixture thereof.

9. The method of claim 1, wherein the binder comprises one or more azo compounds.

10. The method of claim 1, wherein the liquid medium comprises water, methanol, ethanol, propanol, isopropanol, n-butanol, sec-butanol, isobutanol, tert-butanol, ethylene glycol, dimethyl ether, diethyl ether, tetrahydrofuran, or any mixture of thereof, and wherein the mixture comprises about 48 wt % to about 55 wt % of the lignosulfonic acid or salt thereof, about 1.3 wt % to about 5.5 wt % of the hydrophobizing agent, and about 40 wt % to about 50 wt % of the liquid medium, wherein all weight percents are based on the combined weight of the lignosulfonic acid or salt thereof, the hydrophobizing agent, and the liquid medium.

11. The method of claim 1, wherein the binder comprises a free radical precursor comprising a mixture of hydrogen peroxide and an iron containing catalyst, wherein the salt of the lignosulfonic acid is present and comprises ammonium lignosulfonate, sodium lignosulfonate, potassium lignosulfonate, calcium lignosulfonate, magnesium lignosulfonate, or any mixture thereof, wherein the hydrophobizing agent comprises a rosin, an alkyl ketene dimer, an alkenylsuccinic anhydride, a paraffin oil, a silicone oil, a vegetable oil, an animal fat, a hydrocarbon resin, turpentine, carene, thujene, sabinene, or any mixture thereof, and wherein the liquid medium comprises water.

12. The method of claim 1, wherein the binder comprises an isocyanate resin.

13. The method of claim 1, wherein the lignosulfonic acid or salt thereof comprises ammonium lignosulfonate, the hydrophobizing agent comprises a wax, and the liquid medium comprises water, and wherein the mixture is an emulsion.

14. The method of claim 1, wherein the mixture comprises at least 50 wt % of the lignosulfonic acid or salt thereof and less than 45 wt % of the liquid medium, based on the combined weight of the lignosulfonic acid or salt thereof, the hydrophobizing agent, and the liquid medium.

15. A method for making a composite product, comprising:
   mixing a plurality of lignocellulose substrates, a binder, and an emulsion comprising a lignosulfonic acid or a salt thereof, a hydrophobizing agent, and a liquid medium to produce a resinated furnish, wherein:
      the binder comprises an isocyanate resin, a urea-formaldehyde resin, a phenol-formaldehyde resin, a melamine-urea-formaldehyde resin, a melamine-formaldehyde resin, a melamine-urea-phenol-formaldehyde resin, a free radical precursor, or any mixture thereof, and
      the emulsion comprises about 40 wt % to about 60 wt % of the lignosulfonic acid or salt thereof, about 1 wt % to about 20 wt % of the hydrophobizing agent, and about 20 wt % to about 59 wt % of the liquid medium, based on the combined weight of the lignosulfonic acid or salt thereof, the hydrophobizing agent, and the liquid medium; and at least partially curing the binder in the resinated furnish to produce a composite product.

16. The method of claim 15, wherein:

the binder comprises the free radical precursor, and wherein the free radical precursor comprises a mixture of hydrogen peroxide and an iron containing catalyst, the hydrophobizing agent comprises one or more rosins, one or more alkyl ketene dimers, one or more alkenyl-succinic anhydrides, one or more paraffin oils, one or more silicone oils, one or more vegetable oils, one or more animal fats, one or more hydrocarbon resins, turpentine, carene, thujene, sabinene, or any mixture thereof, the emulsion comprises the salt of the lignosulfonic acid, the salt of the lignosulfonic acid comprises ammonium lignosulfonate, sodium lignosulfonate, potassium lignosulfonate, calcium lignosulfonate, magnesium lignosulfonate, or any mixture thereof, and the liquid medium comprises water, methanol, ethanol, propanol, isopropanol, n-butanol, sec-butanol, isobutanol, tert-butanol, ethylene glycol, dimethyl ether, diethyl ether, tetrahydrofuran, or any mixture of thereof.

17. A method for making a composite product, comprising:

mixing a plurality of lignocellulose substrates, a binder, and a mixture comprising ammonium lignosulfonate, a hydrophobizing agent, and water to produce a resinated furnish, wherein the mixture comprises about 40 wt % to about 60 wt % of the ammonium lignosulfonate, about 1 wt % to about 20 wt % of the hydrophobizing agent, and about 20 wt % to about 59 wt % of the water, based on the combined weight of the ammonium lignosulfonate, the wax, and the water; and heating the resinated furnish to produce a composite product.

18. The method of claim 17, wherein:

the hydrophobizing agent comprises slack wax, paraffin wax, or a mixture thereof, the binder comprises a free radical precursor comprising a mixture of hydrogen peroxide and an iron containing catalyst, and the mixture comprises about 45 wt % to about 55 wt % of the ammonium lignosulfonate, about 1 wt % to about 10 wt % of the hydrophobizing agent, and about 40 wt % to about 50 wt % of the water, based on the combined weight of the ammonium lignosulfonate, the hydrophobizing agent, and the water.

19. The method of claim 17, wherein:

the hydrophobizing agent comprises one or more rosins, one or more alkyl ketene dimers, one or more alkenyl-succinic anhydrides, one or more paraffin oils, one or more silicone oils, one or more vegetable oils, one or more animal fats, one or more hydrocarbon resins, turpentine, carene, thujene, sabinene, or any mixture thereof, the binder comprises a free radical precursor comprising a mixture of hydrogen peroxide and an iron containing catalyst, and the mixture comprises about 45 wt % to about 55 wt % of the ammonium lignosulfonate, about 1 wt % to about 10 wt % of the hydrophobizing agent, and about 40 wt % to about 50 wt % of the water, based on the combined weight of the ammonium lignosulfonate, the hydrophobizing agent, and the water.

20. The method of claim 18, wherein:

the hydrophobizing agent comprises a mixture of paraffin wax and at least one component selected from the group consisting of: a rosin, an alkyl ketene dimer, an alkenyl-succinic anhydride, a paraffin oil, a silicone oil, a vegetable oil, an animal fat, turpentine, carene, thujene, and sabinene, the iron containing catalyst comprises a complex of iron and ethylenediaminetetraacetic acid, and the mixture comprises about 48 wt % to about 55 wt % of the ammonium lignosulfonate, about 1.3 wt % to about 5.5 wt % of the hydrophobizing agent, and about 40 wt % to about 50 wt % of the water, based on the combined weight of the ammonium lignosulfonate, the wax, and the water.

* * * * *